US012496796B2

(12) United States Patent
Whatling et al.

(10) Patent No.: US 12,496,796 B2
(45) Date of Patent: *Dec. 16, 2025

(54) METHODS AND MACHINE FOR FORMING CONTAINERS HAVING TOP FLANGE WITH GLUED CORNERS

(71) Applicant: Westrock Shared Services, LLC, Atlanta, GA (US)

(72) Inventors: Tom J. Whatling, Harleston (GB); Alyssa J. Scherer, Duluth, GA (US); John Valencia, Johns Creek, GA (US); Daniel Stamp, Yate (GB)

(73) Assignee: WestRock Packaging Systems, LLC, Atlanta, GA (US)

( * ) Notice: Subject to any disclaimer, the term of this patent is extended or adjusted under 35 U.S.C. 154(b) by 155 days.

This patent is subject to a terminal disclaimer.

(21) Appl. No.: 18/165,897

(22) Filed: Feb. 7, 2023

(65) Prior Publication Data

US 2023/0182428 A1 Jun. 15, 2023

Related U.S. Application Data

(63) Continuation-in-part of application No. PCT/US2022/036722, filed on Jul. 11, 2022.

(Continued)

(51) Int. Cl.

*B31B 50/46* (2017.01)
*B31B 50/02* (2017.01)

(Continued)

(52) U.S. Cl.

CPC ............ *B31B 50/46* (2017.08); *B31B 50/022* (2017.08); *B31B 50/624* (2017.08);

(Continued)

(58) Field of Classification Search

CPC ..... B31B 50/46; B31B 50/624; B31B 50/741; B31B 50/022; B31B 2100/0024; B31B 2110/35

See application file for complete search history.

(56) References Cited

U.S. PATENT DOCUMENTS 1,693,136 A * 11/1928 Carle ...................... B31B 70/00 493/110
1,974,527 A * 9/1934 Bliss ...................... B65D 5/323 229/122.25

(Continued)

FOREIGN PATENT DOCUMENTS

AT 516596 A2 * 6/2016
CA 2833157 A1 * 5/2014 ............ B31B 50/00

(Continued)

OTHER PUBLICATIONS

International Search Report and Written Opinion for International Application No. PCT/US2022/036722, dated Nov. 7, 2022, 9 pages.

(Continued)

*Primary Examiner* — Lucas E. A. Palmer
(74) *Attorney, Agent, or Firm* — Brian J. Goldberg; Tsugihiko Suzuki; Rohini K. Garg

(57) ABSTRACT

A container forming apparatus for forming a container from a blank includes a blank transfer station including an adhesive assembly having a plurality of adhesive applicators, and a compression station downstream of the blank transfer station, the compression station including a vertically movable mandrel and a forming tool below the mandrel. The forming tool defines a cavity therein and has an inner profile complementary in shape to an outer profile of the mandrel. Hot-melt adhesive is applied to a surface of the blank as the blank is transferred through the adhesive assembly. The blank is positioned beneath the mandrel, and the mandrel drives the blank downward into the cavity of forming tool.

(Continued)

Compression plates fold panels of the blank, and the formed container includes a fully formed top flange.

20 Claims, 28 Drawing Sheets

Related U.S. Application Data

(60) Provisional application No. 63/320,428, filed on Mar. 16, 2022, provisional application No. 63/309,805, filed on Feb. 14, 2022, provisional application No. 63/248,039, filed on Sep. 24, 2021, provisional application No. 63/220,311, filed on Jul. 9, 2021.

(51) Int. Cl.

| | |
|---|---|
| ***B31B 50/62*** | (2017.01) |
| ***B31B 50/74*** | (2017.01) |
| *B31B 100/00* | (2017.01) |
| *B31B 110/35* | (2017.01) |

(52) U.S. Cl.
CPC .... *B31B 50/741* (2017.08); *B31B 2100/0024* (2017.08); *B31B 2110/35* (2017.08)

(56) References Cited

U.S. PATENT DOCUMENTS 2,263,545 A * 11/1941 Waldvogel ........... B65D 5/0227 493/100
2,832,270 A * 4/1958 Pierce, Jr. ............... B31B 50/00 53/449
3,034,698 A * 5/1962 Forrer .................. B65D 5/3642 229/117.07
3,046,849 A * 7/1962 Bowman ................. B31B 50/46 493/143
3,513,757 A * 5/1970 Di Frank ................. B65H 1/06 493/131
3,658,235 A * 4/1972 Katzenmayer ....... B65D 5/6661 229/148
3,673,928 A * 7/1972 Striplin ................... B31B 50/30 493/126
3,683,755 A * 8/1972 Lattke ..................... B31B 50/00 493/131
3,709,114 A * 1/1973 Johnson .................. B31B 50/30 493/134
3,756,495 A * 9/1973 Bemiss .................. B65D 5/563 229/162.1
3,767,108 A * 10/1973 Arneson ................ B65D 5/246 229/106
3,812,641 A * 5/1974 Bemiss ................. B65B 7/2871 53/131.3
3,940,053 A * 2/1976 Putman ................ B65D 5/0035 229/176
3,978,774 A * 9/1976 Royal ..................... B31B 50/00 493/168
4,012,999 A * 3/1977 Crawford ................ B31B 50/00 493/131
4,056,223 A * 11/1977 Williams ............. B65D 5/0045 229/160
4,189,088 A * 2/1980 Rappolt ................. B65D 5/247 229/188
4,285,461 A * 8/1981 Meyers .............. B65D 77/2076 229/207
4,304,329 A * 12/1981 Graser ................. B65D 5/2033 206/148
4,596,542 A * 6/1986 Moen ................... B65D 5/0075 493/167
4,621,766 A * 11/1986 McClure .............. B65D 5/6632 229/117.17
4,792,084 A * 12/1988 Dreeszen ............. B65D 5/2033 229/109
4,794,024 A * 12/1988 Crowell .................... G09F 1/06 446/148
5,147,271 A * 9/1992 Bacques ................ B65D 5/029 493/143
5,156,583 A * 10/1992 Baas ....................... B31B 50/52 493/174
5,267,686 A * 12/1993 Gulliver ................. B65D 5/241 229/120.16
5,295,623 A * 3/1994 Bacques ................ B65D 71/36 53/448
5,326,021 A * 7/1994 Farrell ..................... B65D 5/28 229/109
5,369,939 A * 12/1994 Moen ...................... B65B 7/285 53/376.5
5,402,931 A * 4/1995 Gulliver ................. B65D 5/241 229/242
5,772,108 A * 6/1998 Ruggiere, Sr. ......... B65D 5/441 229/199
5,916,079 A * 6/1999 Haring .................... B31B 50/30 493/131
6,367,690 B1 * 4/2002 McClure ............. B65D 5/4608 229/142
6,520,898 B1 * 2/2003 Moen ..................... B65D 5/322 493/90
8,939,352 B2 * 1/2015 Delause ................ B65D 5/323 229/122.26
9,187,204 B2 * 11/2015 Mathieu .................. B31B 50/00
2005/0051461 A1 * 3/2005 Bryant ................ B65D 5/6626 206/769
2008/0032878 A1 * 2/2008 Kisch ...................... B31B 50/44 493/174
2011/0065559 A1 * 3/2011 Atoui ...................... B31B 50/30 493/162
2011/0281705 A1 * 11/2011 Aganovic ............... B31B 50/26 493/162
2012/0273379 A1 * 11/2012 Loftin .................... B65D 71/36 206/427
2014/0113787 A1 * 4/2014 Aganovic ............... B31B 50/00 493/122
2014/0231494 A1 * 8/2014 Yang ...................... B65D 5/247 229/108
2014/0249008 A1 * 9/2014 Aganovic .............. B65D 5/003 493/167
2014/0263600 A1 * 9/2014 Valencia .............. B65D 5/4204 229/162.1
2015/0344169 A1 * 12/2015 Fath ....................... B65D 5/548 229/200
2016/0068297 A1 * 3/2016 Arki ................... B65D 5/46144 493/309
2021/0078757 A1 * 3/2021 Wisecarver .......... B65D 5/4266
2022/0185532 A1 * 6/2022 Valencia ............ B65D 5/48022
2023/0174267 A1 * 6/2023 Whatling ............. B65D 5/2047 229/169

FOREIGN PATENT DOCUMENTS

| | | | | | |
|---|---|---|---|---|---|
| CN | 106132835 | A * | 11/2016 | ............. | B31B 50/00 |
| EP | 0022139 | A1 | 1/1981 | | |
| EP | 3470341 | A1 | 4/2019 | | |
| EP | 3542670 | A1 | 9/2019 | | |
| EP | 3621789 | B1 * | 7/2024 | ........... | B31B 50/022 |
| ES | 1264834 | U | 4/2021 | | |
| GB | 1436205 | A | 5/1976 | | |
| WO | 2013146592 | A1 | 10/2013 | | |
| WO | WO-2019104437 | A1 * | 6/2019 | ........... | B31B 50/062 |

OTHER PUBLICATIONS

International Search Report and Written Opinion for International Application No. PCT/US2022/036720, dated Sep. 22, 2022, 9 pages.
"Biodegradable Mustang Paper Tray food tray fruit container making machine," YouTube, Nov. 21, 2020, https://www.youtube.com/watch?v=AyUGXyieghg.

(56) References Cited

OTHER PUBLICATIONS

"Halopack process," Vimeo, Dec. 6, 2012, https://vimeo.com/55022774.
"New Air plane food box supply machine//disposable paper meal lunch box forming machine (High Speed)," YouTube, Feb. 11, 2021, https://www.youtube.com/watch?v=Oli6aZrEN8Y.
"Gietz HTF 940—Tray Forming at its best." YouTube, Jan. 14, 2016, https://www.youtube.com/watch?v=7oc261q-c8E.
"ProducePack Punnet," Product web page accessed on Jun. 21, 2021 at URL: https://www.graphicpkg.com/products/producepack-punnet/.
"Cardboard Punnets Corrugated and Solidboard," Product web page accessed on Jun. 21, 2021 at URL: https://www.smurfitkappa.com/us/sectors/fresh-produce/punnets.
Gietz AG, "Gietz HTF 940/1270 Datasheet," Jan. 2020, Gietz AG Manufacturing, Gossau, Switzerland.

* cited by examiner

METHODS AND MACHINE FOR FORMING CONTAINERS HAVING TOP FLANGE WITH GLUED CORNERS

CROSS-REFERENCE TO RELATED APPLICATIONS

This application is a continuation-in-part of International Patent Application No. PCT/US2022/036722, filed Jul. 11, 2022, which claims priority to U.S. Provisional Patent Application No. 63/220,311 filed Jul. 9, 2021, U.S. Provisional Patent Application No. 63/309,805 filed Feb. 14, 2022, U.S. Provisional Patent Application No. 63/320,428 filed Mar. 16, 2022, and to U.S. Provisional Patent Application No. 63/248,039 filed Sep. 24, 2021, each of which is incorporated by reference herein in its entirety.

BACKGROUND

The field of the present disclosure relates generally to machines and methods of forming containers, and, more particularly, to a machine for forming a container having atop flange with corners thereof that are glued during formation of the container by the machine.

Containers come in a variety of forms. Certain conventional containers, such as boxes, punnets, trays, etc., typically have an enclosed bottom portion with four sides. Some containers include a top portion or lid to close the container, while other containers have open tops. In some instances, containers are formed and are later filled with a product and then sealed with a film adhered across the top thereof, to close the container.

In some such instances, the containers are initially formed with an open top portion such that they can be later filled. Frequently, such containers are formed and stacked or nested with one another, and are transported to another location for filling and/or sealing. In some instances, containers include a flanged portion around their top rim, to which a sealing film is eventually adhered. In some known containers containing these flanged portions, the flange is not formed at the same time that the container is initially formed. Rather, formed containers with planar (unflanged) sidewalls are stacked and transported for filling; once filled, the flanges of the containers are folded outwards to form the sealing surface during the sealing process.

Other conventional containers may have the flange formed during initial formation of the container, but the flange is formed by merely folding the flange into place. That is, the flange is not set or glued in place.

These known containers may be weak and prone to disengagement of various portions of the flange with one another. Further, such containers may experience a poor seal, because the flange is prone to disengagement, or require a more robust seal, which can be complex, time-consuming, and/or expensive to produce.

BRIEF DESCRIPTION

In one aspect, a container forming apparatus for forming a container from a blank is provided. The blank includes a bottom panel, two opposing side panels, two opposing end panels, four corner panels, and a respective flange panel extending from a top edge of each end panel, side panel, and corner panel. The apparatus includes a blank transfer station including an adhesive assembly comprising a plurality of adhesive applicators. The blank is transferred in a blank transfer direction through the adhesive assembly, where at least one of the adhesive applicators applies hot-melt adhesive to an exterior surface of the flange panels extending from the top edge of the corner panels. The apparatus also includes a compression station downstream of the blank transfer station, the compression station including a vertically movable mandrel and a forming tool below the mandrel, wherein the forming tool defines a cavity therein and has an inner profile complementary in shape to an outer profile of the mandrel. The blank is positioned beneath the mandrel, and the mandrel drives the blank downward into the cavity of forming tool, which rotates the corner panels inwardly into engagement with the mandrel and rotates the side panels and end panels inwardly into engagement with the mandrel. The compression station further includes compression plates coupled to the mandrel. The compression plates rotate the flange panels outwardly into engagement with a top edge of the forming tool, the compression panels further compressing the flange panels extending from the top edge of the corner panels against the flange panels extending from the top edge of the side and end panels to form the container having a fully formed top flange.

In a further aspect, a method of forming a container from a blank using a container forming apparatus is provided. The blank includes a bottom panel, two opposing side panels, two opposing end panels, four corner panels, and a respective flange panel extending from a top edge of each end panel, side panel, and corner panel. The apparatus includes (i) a blank transfer station including an adhesive assembly having a plurality of adhesive applicators, and (ii) a compression station downstream of the blank transfer station, the compression station including a vertically movable mandrel and a forming tool below the mandrel, wherein the forming tool defines a cavity therein and has an inner profile complementary in shape to an outer profile of the mandrel. The method includes transferring the blank through the adhesive assembly, applying, using the plurality of adhesive applicators, hot-melt adhesive to an exterior surface of the flange panels extending from the top edge of the corner panels, and positioning the blank below the mandrel. The method further includes, using the mandrel, driving the blank downwards into the cavity of the forming tool, the driving causing the forming tool to: (a) rotate the corner panels inwardly into engagement with the mandrel, and (b) rotate the side panels and end panels inwardly into engagement with the mandrel. The method also includes rotating, using compression plates coupled to the mandrel, rotate the flange panels outwardly into engagement with a top edge of the forming tool, and compressing, using the compression plates, the flange panels extending from the top edge of the corner panels against the flange panels extending from the top edge of the side and end panels to form the container having a fully formed top flange.

In another aspect, a container forming apparatus for forming a container from a blank is disclosed. The blank includes a bottom panel, two opposing side panels, two opposing end panels, a respective end flange panel extending from a top edge of each end panel, a respective end flange tab extending from each side edge of each end flange panel, a respective side flange panel extending from a top end of each side panel, and a respective side flange tab extending from each end edge of each side flange panel. The apparatus includes a blank transfer station including an adhesive assembly having a plurality of adhesive applicators, and a compression station downstream of the blank transfer station. The blank is transferred in a blank transfer direction through the adhesive assembly, where at least one of the adhesive applicators applies hot-melt adhesive to an interior surface of the side flange tabs. The compression station includes a vertically movable mandrel and a forming tool below the mandrel, wherein the forming tool defines a cavity therein and has an inner profile complementary in shape to an outer profile of the mandrel. The blank is positioned beneath the mandrel, and the mandrel drives the blank downward into the cavity of forming tool, which rotates the end panels inwardly into engagement with the mandrel and rotates the side panels inwardly into engagement with the mandrel and the end panels. The compression station further includes end compression plates and side compression plates coupled to the mandrel. The side compression plates rotate the side flange panels outwardly into engagement with a top edge of the forming tool, and, subsequently, the end compression plates rotate the end flange panels outwardly into engagement with the top edge of the forming tool, the end compression panels further compressing the end flange tabs against the side flange tabs to form the container having a fully formed top flange.

In another aspect, a method of forming a container from a blank using a container forming apparatus is provided. The blank includes a bottom panel, two opposing side panels, two opposing end panels, a respective end flange panel extending from a top edge of each end panel, a respective end flange tab extending from each side edge of each end flange panel, a respective side flange panel extending from a top end of each side panel, and a respective side flange tab extending from each end edge of each side flange panel. The apparatus includes (i) a blank transfer station including an adhesive assembly having a plurality of adhesive applicators, and (ii) a compression station downstream of the blank transfer station, the compression station comprising a vertically movable mandrel and a forming tool below the mandrel, wherein the forming tool defines a cavity therein and has an inner profile complementary in shape to an outer profile of the mandrel. The method includes transferring the blank through the adhesive assembly, applying, using the plurality of adhesive applicators, hot-melt adhesive to an interior surface of the side flange tabs, and positioning the blank below the mandrel. The method also includes using the mandrel, driving the blank downwards into the cavity of the forming tool, said driving causing the forming tool to: (a) rotate the end panels inwardly into engagement with the mandrel, and (b) rotate the side panels inwardly into engagement with the mandrel and into engagement with the end panels. The method further includes rotating, using side compression plates coupled to the mandrel, the side flange panels outwardly into a parallel orientation to the bottom panel, after rotating the side flange panels, rotating, using end compression plates coupled to the mandrel, the end flange panels into a parallel orientation to the bottom panel, and compressing, using the end compression plates, the end flange tabs against the side flange tabs to form the container having a fully formed top flange.

In other aspects, containers formed using such methods and blanks for forming such containers are also provided.

DETAILED DESCRIPTION

The following detailed description illustrates the disclosure by way of example and not by way of limitation. The description clearly enables one skilled in the art to make and use the disclosure, describe several embodiments, adaptations, variations, alternatives, and make use of the disclosure, including what is presently believed to be the best mode of carrying out the disclosure.

Embodiments of the present disclosure provide a stackable container including a top flange. The container is constructed from a blank of sheet material using a machine and/or by hand. For example, the blank can be folded around a mandrel to form a container, or the container can be formed by hand and/or by another style of a tray forming machine. Alternatively, a folder/glue machine can be used to form the container. In one embodiment, the container is fabricated from a paperboard material. The container, however, may be fabricated using any suitable material, and therefore is not limited to a specific type of material. In alternative embodiments, the container is fabricated using cardboard, plastic, fiberboard, foam board, corrugated paper, and/or any suitable material known to those skilled in the art and guided by the teachings herein provided.

In an example embodiment, the container includes at least one marking thereon including, without limitation, indicia that communicates the product, a manufacturer of the product, and/or a seller of the product. For example, the marking may include printed text that indicates a product's name and briefly describes the product, logos and/or trademarks that indicate a manufacturer and/or seller of the product, and/or designs and/or ornamentation that attract attention. "Printing," "printed," and/or any other form of "print" as used herein may include, but is not limited to including, ink jet printing, laser printing, screen printing, giclee, pen and ink, painting, offset lithography, flexography, relief print, rotogravure, dye transfer, and/or any suitable printing technique known to those skilled in the art and guided by the teachings herein provided. In another embodiment, the container is void of markings, such as, and without limitation, indicia that communicates the product, a manufacturer of the product and/or a seller of the product.

In some embodiments, an interior and/or an exterior surface of the blank, and the resultant container, is coated or sealed. Such coating or sealing may make the container water resistant or resistant to bacteria. In other embodiments, the seal or coating may facilitate preserving a freshness of a product (e.g., a produce product) retained in the container. In any embodiment, such a coating or sealing may be applied to any section(s) of any surface(s) of the container.

Figure 1:
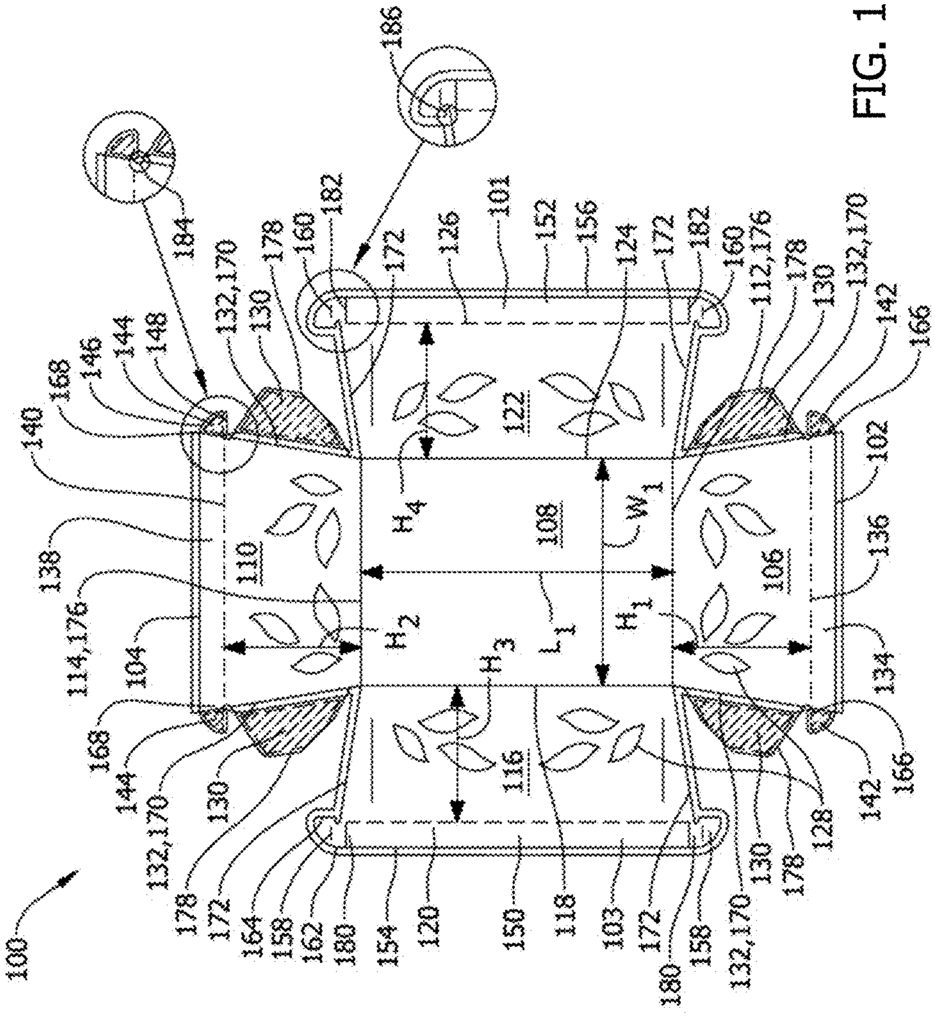
FIG. 1 is a top plan view of an example blank of sheet material for forming a container in accordance with the present disclosure.

Referring now to the drawings, and more specifically to FIG. 1, depicted is a top plan view of an example embodiment of a blank 100 of sheet material. A container 200 (see FIG. 2) is formed from blank 100. Blank 100 has a first or interior surface 101 and an opposing second or exterior surface 103. Further, blank 100 defines a leading edge 102 and an opposing trailing edge 104. In one embodiment, blank 100 includes, in series, a first end panel 106, a bottom panel 108, and a second end panel 110 coupled together along preformed, generally parallel, fold lines 112 and 114, respectively.

More specifically, first end panel 106 extends from a free edge 105 to fold line 112, bottom panel 108 extends from fold line 112 to fold line 114, and second end panel 110 extends from fold line 114 to a free edge 107. When container 200 is formed from blank 100, as described further herein, fold line 112 defines a bottom edge of first end panel 106 and a first end edge of bottom panel 108, and fold line 114 defines a second end edge of bottom panel 108 and a bottom edge of second end panel 110.

A first side panel 116 extends from a fold line at a first side edge 118 of bottom panel 108 to a fold line 120, and an opposing second side panel 122 extends from a fold line at a second side edge 124 of bottom panel 108 to a fold line 126. When container 200 is formed from blank 100, as described further herein, the fold line at first side edge 118 defines a bottom edge of first side panel 116 and a first side edge of bottom panel 108, and the fold line at second side edge 124 defines a second side edge of bottom panel 108 and a bottom edge of second side panel 122.

In the example embodiment, first end panel 106, second end panel 110, first side panel 116, and second side panel 122 include a plurality of cutouts 128 defined therein. In the example embodiment, cutouts 128 are leaf-shaped, and each of first end panel 106, second end panel 110, first side panel 116, and second side panel 122 have six cutouts. Alternatively, blank 100 may include any suitable number of cutouts 128 of any suitable shape and/or in any suitable location that enables blank 100 and/or container 200 to function as described herein. In yet other embodiments, one or more of panels 106, 110, 116, and 122 of blank 100 may have no cutouts 128.

First end panel 106 has a height $H_1$, second end panel 110 has a height $H_2$, first side panel 116 has a height $H_3$, and second side panel 122 has a height $H_4$. In the example embodiment, height $H_1$ of first end panel 106, height $H_2$ of second end panel 110, height $H_3$ of first side panel 116, and height $H_4$ of second side panel 122 are substantially the same. Further, bottom panel 108 has a length $L_1$ and a width $W_1$. In the example embodiment, length $L_1$ is greater than width $W_1$, such that bottom panel 108 is rectangular. In an alternative embodiment, width $W_1$ is substantially equal to, or greater than, length $L_1$.

In the example embodiment, side edges 170 of end panels 106, 110 and end edges 172 of side panels 116, 122 and are generally linear and extend at respective angles with respect to the bottom panel 108. In other words, in the example embodiment, side edges 170 of end panels 106, 110 are not parallel with side edges 118, 124 of bottom panel 108, and end edges 172 of side panels 116, 122 are not parallel with the end edges (at fold lines 112 and 114) of bottom panel 108.

Therefore, first end panel 106, second end panel 110, first side panel 116, and second side panel 122 each have a generally trapezoidal shape, in which panels 106, 110, 116, 122 taper outwardly as they extend away from bottom panel 108. That is, a respective width (not specifically shown) of end panels 106, 110 adjacent bottom panel 108 is less than a respective width (not specifically shown) of end panels 106, 110 opposite bottom panel 108. Likewise, a respective length (not specifically shown) of side panels 116, 122 adjacent bottom panel 108 is less than a respective length (not specifically shown) of side panels 116, 122 opposite bottom panel 108.

Alternatively, first end panel 106, second end panel 110, first side panel 116, second side panel 122, and/or bottom panel 108 may have any suitable shape and/or any suitable dimensions that enable blank 100 and/or container 200 to function as described herein.

Interior side panels 130, also referred to as glue panels, extend from each side edge of each end panel 106, 110, at respective fold lines 132. As such, blank 100 includes four interior side panels 130. Each interior side panels 130 has a respective free edge 178 opposing the respective fold line 132 from which the interior side panel 130 extends. In the example embodiment, free edge 178 includes a plurality of linear portions, such as four adjoining linear portions. In alternative embodiments, free edge 178 may be partially or fully arcuate, or may have any suitable shape that enables blank 100 and/or container 200 to function as described herein.

Additionally, a first end flange panel 134 extends from first end panel 106, and a second end flange panel 138 extends from second end panel 110. More particularly, first end flange panel 134 extends from free edge 105 to a fold line 136 at a top edge of first end panel 106, and second end flange panel 138 extends from a fold line 140 at atop edge of second end panel 110 to free edge 107.

First end flange panel 134 and second flange panel 138 include first end flange tabs 142 and second end flange tabs 144, respectively. First end flange tabs 142 extend from a respective fold line 166 at each side edge of first end flange panel 134, and second end flange tabs 144 extend from a respective fold line 168 at each side edge of second end flange panel 138. In the example embodiment, each of first end flange tabs 142 and second end flange tabs 144 has, respectively, a free outside edge 146 that is generally arc shaped and a free inside edge 148 that is generally linear. As described further herein with respect to container 200, the shape of free outside edge 146 generally defines the shape of a corner 218 of the formed top flange 214 of container 200 (see FIG. 2), when container 200 is formed from blank 100. Therefore, in various alternative embodiments, first end flange tabs 142 and second end flange tabs 144 may have any suitable shape that enables blank 100 and/or container 200 to function as described herein.

A first side flange panel 150 extends from first side panel 116, and a second side flange panel 152 extends from second side panel 122. More particularly, first side flange panel 150 extends from fold line 120 to a free edge 154 (also referred to as leading edge 102 or a first side edge of blank 100), and second side flange panel 152 extends from fold line 126 to a free edge 156 (also referred to as trailing edge 104 or a second side edge of blank 100).

First side flange panel 150 and second side flange panel 152 include first side flange tabs 158 and second side flange tabs 160, respectively. First side flange tabs 158 extend from each end edge of first side flange panel 150, and second side flange tabs 160 extend from each end edge of second side flange panel 152. In the example embodiment, each of first side flange tabs 158 and second side flange tabs 160 has, respectively, a free outside edge 162 that is generally arc shaped and a free inside edge 164 that is generally linear. As described further herein with respect to container 200, the shape of free outside edge 162 generally defines the shape of a corner 218 of the formed top flange 214 of container 200 (see FIG. 2), when container 200 is formed from blank 100. Therefore, in various alternative embodiments, first side flange tabs 158 and second side flange tabs 160 may have any suitable shape that enables blank 100 and/or container 200 to function as described herein.

In the example embodiment, first end flange tabs 142 and second end flange tabs 144 also each include a respective notch 184, defined between the inside edge 148 thereof and the side edge of the respective end flange panel 134/138 from which the end flange tab 142/144 extends. Likewise, first side flange tabs 158 and second side flange tabs 160 also each include a respective notch 186, defined between the inside edge 164 thereof and the end edge of the respective side flange panel 150/152 from which the side flange tab 158/160 extends. These notches 184, 186 improve the formation of container 200 formed from blank 100, as described further herein, by reducing interference between adjacent end flange tabs 142/144 and side flange tabs 158/160 when blank 100 is folded into container 200. Additionally, notches 184, 186 may facilitate folding and/or the joining or mating of respective flange panels and/or flange tabs.

In the example embodiment, side flange tabs 158, 160 are "deeper," or extend further inward, toward bottom panel 108, than end flange tabs 142, 144. That is, side flange tabs 158, 160 have more extension in the horizontal direction (with respect to the view of FIG. 1) than the extension of end flange tabs 142, 144 in the vertical direction (with respect to the view of FIG. 1)

In the example embodiment, fold lines 166, 168 adjacent end flange tabs 142, 144 are generally aligned with side edges 170 of end panels 106, 110. That is, each end flange tab 142, 144 may be folded obliquely, with respect to the end flange panel 134/138 from which it extends. Additionally, fold lines 180, 182 adjacent side flange tabs 158, 160 are generally perpendicular to fold lines 120, 126. That is, each side flange tab 158, 160 may be folded substantially perpendicularly, with respect to the side flange panel 150/152 from which it extends. In other embodiments, each fold line 166, 168, 180, 182 of each flange tabs 142, 144, 158, 160 may have any orientation that enables blank 100 and/or container 200 to function as described herein.

In some embodiments, portions of flange tabs 142, 144, 158, 160 have reduced thickness, such that when container 200 is formed from blank 100, the corners 218 of flange 214 (see FIG. 2) formed from the coupled flange tabs have improved de-nesting characteristics. The thickness of the flange tabs 142, 144, 158, 160 may be reduced by scoring, compressing, crushing, and the like, of one or more portions of flange tabs 142, 144, 158, 160.

Figure 2:
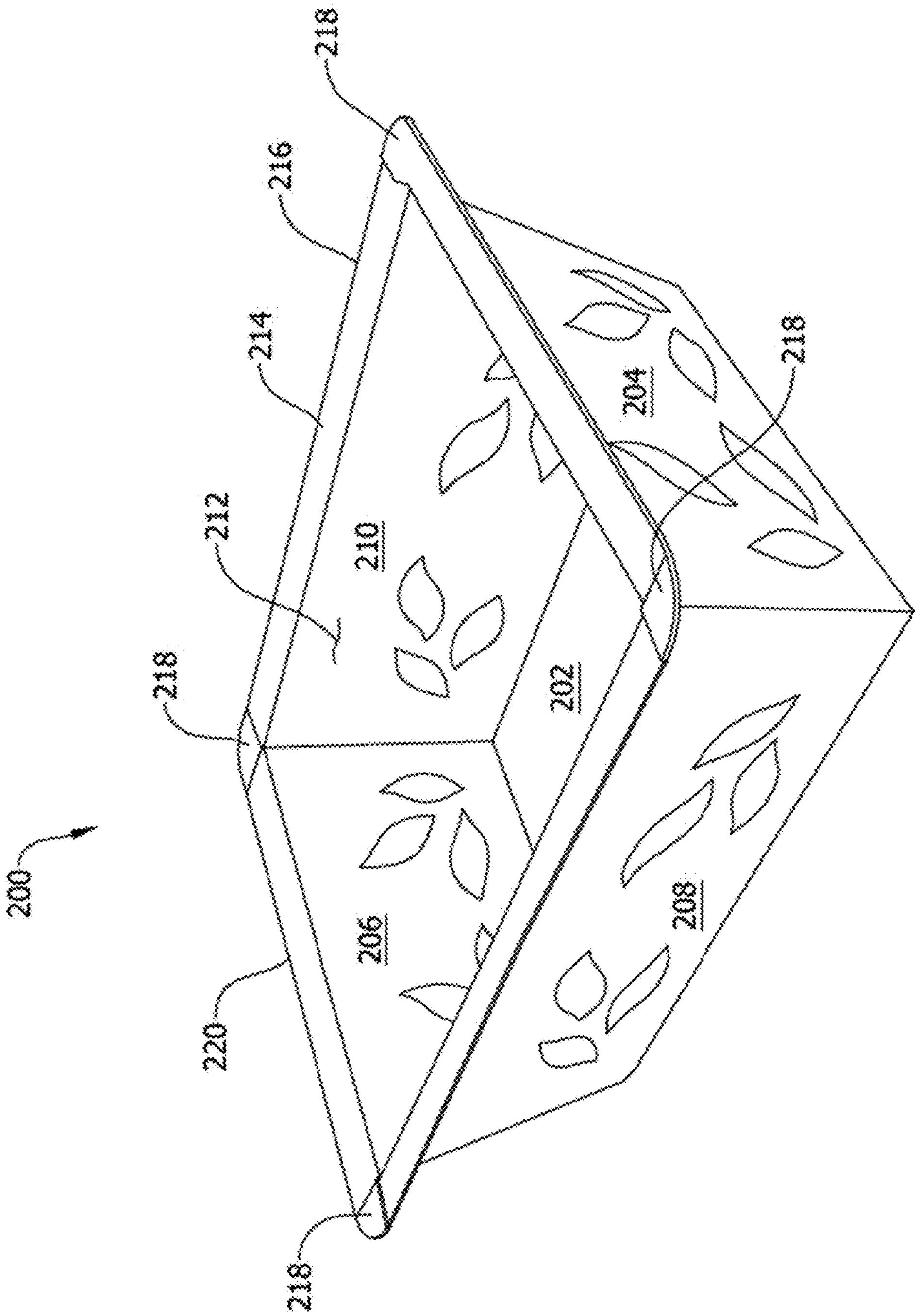
FIG. 2 is a perspective view of an example container formed from the blank shown in FIG. 1.

FIG. 2 is a perspective view of an example container 200 formed from blank 100 (shown in FIG. 1). Container 200 includes a bottom wall 202, first and second opposing end walls 204, 206, and first and second opposing side walls 208, 210. Generally, bottom wall 202 includes bottom panel 108 of blank 100, first end wall 204 includes first end panel 106, second end wall 206 includes second end panel 110, first side wall 208 includes first side panel 116 and two interior side panels 130 (one extending from each of first and second end panels 106, 110), and second end wall 210 includes second side panel 122 and two interior side panels 130 (one extending from each of first and second end panels 106, 110). End walls 204, 206, side walls 208, 210, and bottom wall 202 define a cavity 212 of container 200, for receiving and retaining product (not shown) therein.

In the example embodiment, due to the trapezoidal shape of panels 106, 110, 116, and 122, first and second end walls 204, 206 and first and second side walls 208, 210 extend obliquely away from bottom wall 202. Specifically, in one embodiment, each end wall 204, 206 and each side wall 208, 210 respectively forms an interior angle of more than about 90 degrees with respect to the bottom wall 202. That is, in the example embodiment, walls 204, 206, 208, 210 of the formed container 200 are generally angled outward (i.e., away) from bottom wall 202 of container 200. Therefore, the resulting container 200 is generally of a trapezoidal prism or a truncated pyramid shape. In alternative embodiments, however, end walls 204, 206 and side walls 208, 210 may form any angle with bottom wall 202 that enables blank 100 and/or container 200 to function as described herein.

Container 200 also includes a flange 214 extending from the top of each of first and second end walls 204, 206 and first and second side walls 208, 210. In the example embodiment, flange 214 extends outwardly, or away from cavity 212, and is bounded by a free edge 216 that includes both straight and arcuate segments; specifically, corners 218 of flange 214 are generally arcuate. In the example embodiment, flange 214 is oriented parallel to bottom wall 202. Due to the orientation of the walls of container 200, flange 214 is oriented oblique to first and second end walls 204, 206 and first and second side walls 208, 210. Alternatively, flange 214 may extend in any direction and have any suitable shape that enables blank 100 and/or container 200 to function as described herein.

Container 200 is formed by folding the various panels and tabs of blank 100 along respective fold lines. Specifically, each interior side panel 130 is rotated about fold line 132 towards interior surface 101 of each end panel 106, 110 such that each interior side panel 130 is substantially perpendicular to the respective end panel 106, 110. First end panel 106 and second end panel 110 are rotated about fold lines 112 and 114, respectively, towards interior surface 101 of bottom panel 108 to form first and second end walls 204, 206, respectively. In one embodiment, first and second end panels 106, 110 are rotated to form an angle of more than 90 degrees with respect to bottom panel 108. In alternative embodiments, however, first and second end panels 106, 110 may form any angle with bottom panel 108 that enables blank 100 and/or container 200 to function as described herein.

First side panel 116 is rotated about fold line 118 towards interior surface 101 of bottom panel 108 and into a face-to-face relationship with exterior surface 103 of two interior side panels 130. Likewise, second side panel 122 is rotated about fold line 124 towards interior surface 101 of bottom panel 108 and into a face-to-face relationship with exterior surface 103 of the other two interior side panels 130. In one embodiment, first and second side panels 116, 122 are rotated to form an angle of more than 90 degrees with respect to bottom panel 108. In alternative embodiments, however, first and second side panels 116, 122 are rotated and may form any angle with bottom panel 108 that enables blank 100 and/or container 200 to function as described herein.

In the example embodiment, an adhesive, in particular a hot-melt adhesive, is applied to end portions of interior surface 101 of first side panel 116 and second side panel 122. Accordingly, when these panels 116, 122 are rotated into face-to-face contact with interior side panels 130, the end portions of interior surface 101 of panels 116, 122 are respectively coupled and adhered to exterior surface 103 of interior side panels 130. Thereby, end walls 204, 206 and side walls 208, 210 are formed.

In alternative embodiments, the adhesive may be applied to interior surface 101 of interior side panels 130. In such instances, side panels 116, 122 may be rotated into position first, and end panels 106, 110 may thereafter be rotated, such that interior side panels 130 are coupled and adhered to exterior surface 103 of side panels 116, 122. In still alternative embodiments, interior side panels may instead extend from side panels 116, 122; in such instances, adhesive may be applied and panels 106, 110, 116, 122 rotated in any suitable order to form container 200.

In addition, substantially simultaneously to the forming of the walls of container 200 (e.g., within a same forming step), side flange panels 150, 152 are rotated outwardly (e.g., away from bottom wall 202) about fold lines 120, 126, respectively, until side flange panels 150, 152 are parallel to bottom wall 202. Side flange tabs 158, 160 are moved along with side flange panels 150, 152. That is, rotation of side flange panels 150, 152 results in simultaneous rotation of side flange tabs 158, 160 into the parallel orientation with respect to bottom wall 202.

In one example embodiment, the walls of container 200 are formed substantially simultaneously with the rotation of side flange panels 150, 152. Notably, however, the rotation of side flange panels 150, 152 may occur before or during the folding of end panels 106, 110 to form side walls 204, 206. In particular, side flange panels 150, 152 are folded such that end flange tabs 142, 144 and side flange tabs 158, 160 do not interfere at the corners of the partially formed container. Even more specifically, because end flange tabs 142, 144 are "shorter" or "shallower" than side flange tabs 158, 160 (e.g., the interior edge thereof extends less than the interior edge of side flange tabs 158, 160), the interior edge of end flange tabs 142, 144 does not "catch" on the folded-over side flange tabs 158, 160 as end panels 106, 110 are folded inwardly to form side walls 204, 206.

In a separate step (e.g., after a predetermined amount of time has passed, which may be milliseconds to seconds), end flange panels 134, 138 are rotated outwardly (e.g., away from bottom wall 202) about fold lines 136, 140, respectively, until end flange panels 134, 138 are parallel to bottom wall 202. End flange tabs 142, 144 are moved along with end flange panels 134, 138. That is, rotation of end flange panels 134, 138 results in simultaneous rotation of end flange tabs 142, 144 into the parallel orientation with respect to bottom wall 202. Moreover, this rotation of end flange panels 134, 138 couples exterior surface 103 of end flange tabs 142, 144 in a face-to-face relationship against interior surface 101 of side flange tabs 158, 160 (which are already in their final position, having been previously rotated).

Notably, in the example embodiment, adhesive, such as hot-melt adhesive, is applied to interior surface 101 of side flange tabs 158, 160 prior to the formation of container 200 (e.g., simultaneous with the application of adhesive to side panels 116, 122). Accordingly, when end flange panels 134, 138 are rotated subsequent to side flange panels 150, 152 being rotated, exterior surface 103 of end flange tabs 142, 144 is coupled against and adhered to interior surface 101 of side flange tabs 158, 160.

Thereafter, end flange panels 134, 138, side flange panels 150, 152, end flange tabs 142, 144, and side flange tabs 158, 160 are suitably oriented and secured to form flange 214. Flange corners 218 are formed at the overlap of corresponding end flange tabs 142, 144 and side flange tabs 158, 160. In the example embodiment, flange 214, also referred to as a "top flange," is substantially flat or planar, and is more secure compared to conventional flanges that are not glued, or are not glued until the container is sealed. In at least some instances, where end flange tabs 142, 144 and/or side flange tabs 158, 160 feature a reduced thickness, the overall flange 214 may be even more desirably planar, which may in turn improve the sealing characteristics and/or rigidity of container 200.

Once formed, containers 200 are nested or stacked (see stack 300 of containers 200, shown in FIG. 3) for storage and/or transport thereof. In some instances, these containers 200 are ultimately used to retain a variety of objects. In some embodiments, a stack 300 of containers 200 is delivered to a filling location, at which individual containers 200 are retrieved from the stack 300. As described herein, flange corners 218 of container 200, including end flange tabs 142, 144 and/or side flange tabs 158, 160 that are embossed and/or feature reduced thickness, may improve the de-nesting characteristics of container 200.

The open, empty, and de-nested containers 200 are then filled with a product (e.g., produce). A film 220 is placed across the top of container 200 and sealed against flange 214 to form a seal. Film 220 may be coupled and adhered to flange 214 using any suitable method or material (e.g., adhesive, heat-sealing, etc.).

As described elsewhere herein, flange 214 of container 200 provides structural advantages over flanges of similar containers. Namely, the application of adhesive to side flange tabs 158, 160 to couple end flange tabs 142, 144 to side flange tabs 158, 160 during the initial formation of container 200 increases both the structural integrity and sealing ability of container 200. Conventional containers may have a top flange, but, as described above, such conventional containers are not formed in the same way as container 200 (i.e., do not include a formed flange or do not apply adhesive to join flange tabs during initial container formation), and therefore container 200 provides improvements over known conventional containers.

The application of adhesive when coupling end flange tabs 142, 144 to side flange tabs 158, 160 reinforces and strengthens corners 218 of flange 214, thus enhancing the structural rigidity of container 200. For example, container 200 may be able to hold a greater weight of a product and/or more effectively prevent leakage of liquid. Such enhancement may also reduce the risk of structural failure of container 200 once filled and sealed. Additionally, such reinforcement facilitates improved sealing of container 200. Moreover, flange 214 may be substantially flatter than flanges of conventional containers. Such flanges 214 enables easier, faster, simpler, and/or more cost-effective (e.g., using less sealing material) application of a sealing film to seal container 200. These enhancements enable container 200 to function more effectively than other conventional containers.

Figure 4:
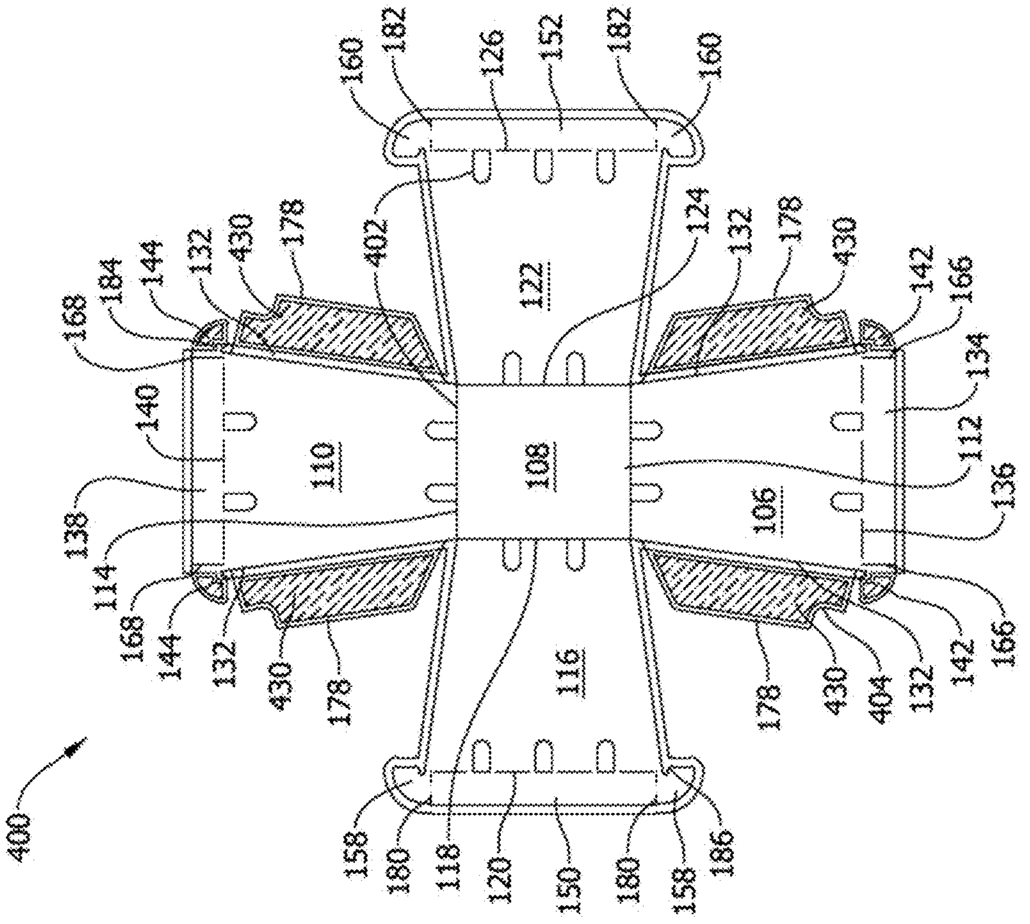
FIG. 4 is a top plan view of another embodiment of a blank of sheet material for forming a container in accordance with the present disclosure.
Figure 5:
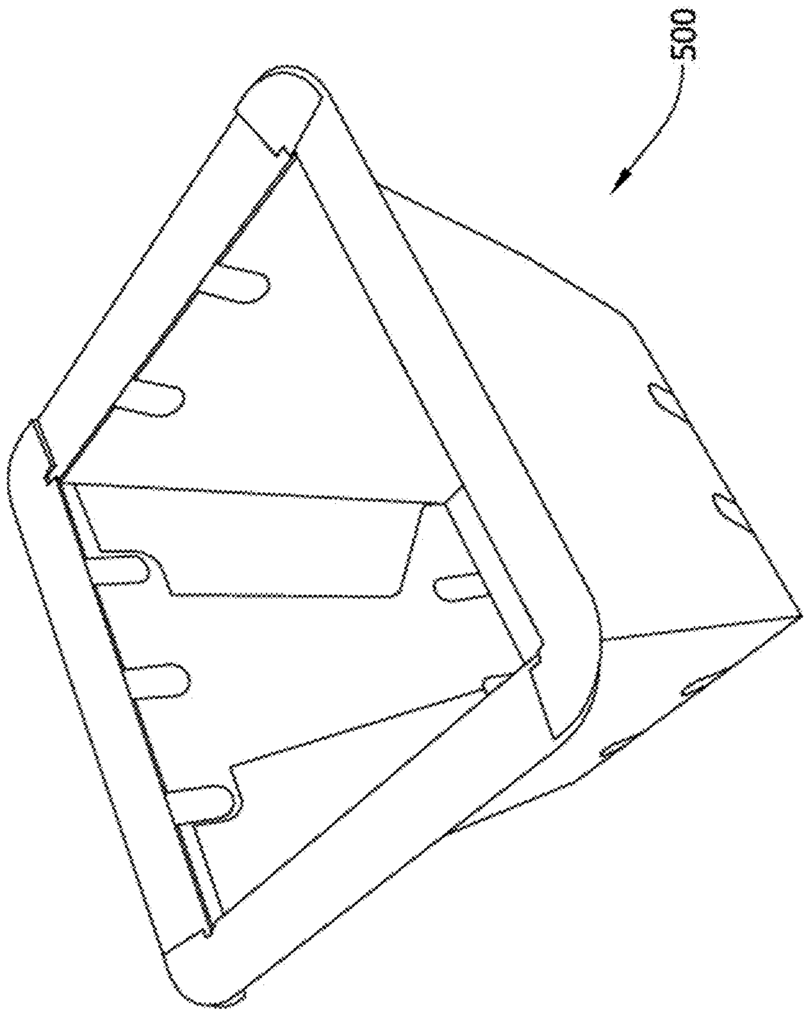
FIG. 5 is a perspective view of an example container formed from the blank shown in FIG. 4.

FIG. 4 is a top plan view of an alternative blank 400 of sheet material for forming a container 500 (see FIG. 5). Blank 400 is substantially similar to blank 100 (shown in FIG. 1), except as noted below. As such, components common to blank 100 and blank 400 are labeled with the same reference symbols.

In one embodiment, blank 400 includes cutouts 402 extending from fold lines 112, 114, 118, 120, 124, 126, 136, 140 into each of first end panel 106, second end panel 110, first side panel 116, and second side panel 122. In this embodiment, cutouts 402 have a general rectangular shape adjacent to fold lines 112, 114, 118, 120, 124, 126, 136, 140 and a general semicircular shape at the opposing end. In the example embodiment, each end panel 106, 110 contains four cutouts 402 and each side panel contains five cutouts 402. In alternative embodiments, blank 400 may include any suitable number of cutouts 402 in any suitable location having any suitable shape that enables blank 400 and/or container 500 to function as described herein.

In one embodiment, blank 400 also includes interior side panels 430 having a different overall shape than interior side panels 130 of blank 100. Interior side panels 430 of blank 400 have free edge 178 opposing fold line 132, where free edge 178 includes a plurality of linear and curved portions. In particular, each free edge 178 includes a curved notch 404, such that, when container 500 is formed from blank, interior side edges 430 do not cover or otherwise interfere with cutouts 402 on side panels 116, 122. That is, curved notch 404 of interior side panels 430 keeps interior side panels 430 from overlapping with cutouts 402 in side panels 116, 122. In alternative embodiments, one or more of free edges 178 may have any suitable shape that enables blank 400 and/or container 500 to function as described herein.

Additionally, bottom panel 108 of blank 400 is smaller and squarer than bottom panel 108 of blank 100. In the example embodiment, similar to blank 100, blank 400 includes end flange tabs 142, 144 and side flange tabs 158, 160. However, in blank 400, fold lines 166, 168, 180, 182 that bound the flange tab are angled such that each flange tab 142, 144, 158, 160 can be folded perpendicular to its respective flange panel 134, 138, 150, 152. In other embodiments, fold lines 166, 168, 180, 182 may have any orientation that enables blank 400 and/or container 500 to function as described herein.

FIG. 5 is a perspective view of an example container 500 formed from blank 400 (shown in FIG. 4). Container 500 is substantially similar to container 200 (shown in FIG. 2), and is formed from blank 400 using a method similar to forming container 200 from blank 100. Container 500 may have different dimensions than container 200.

Figure 6:
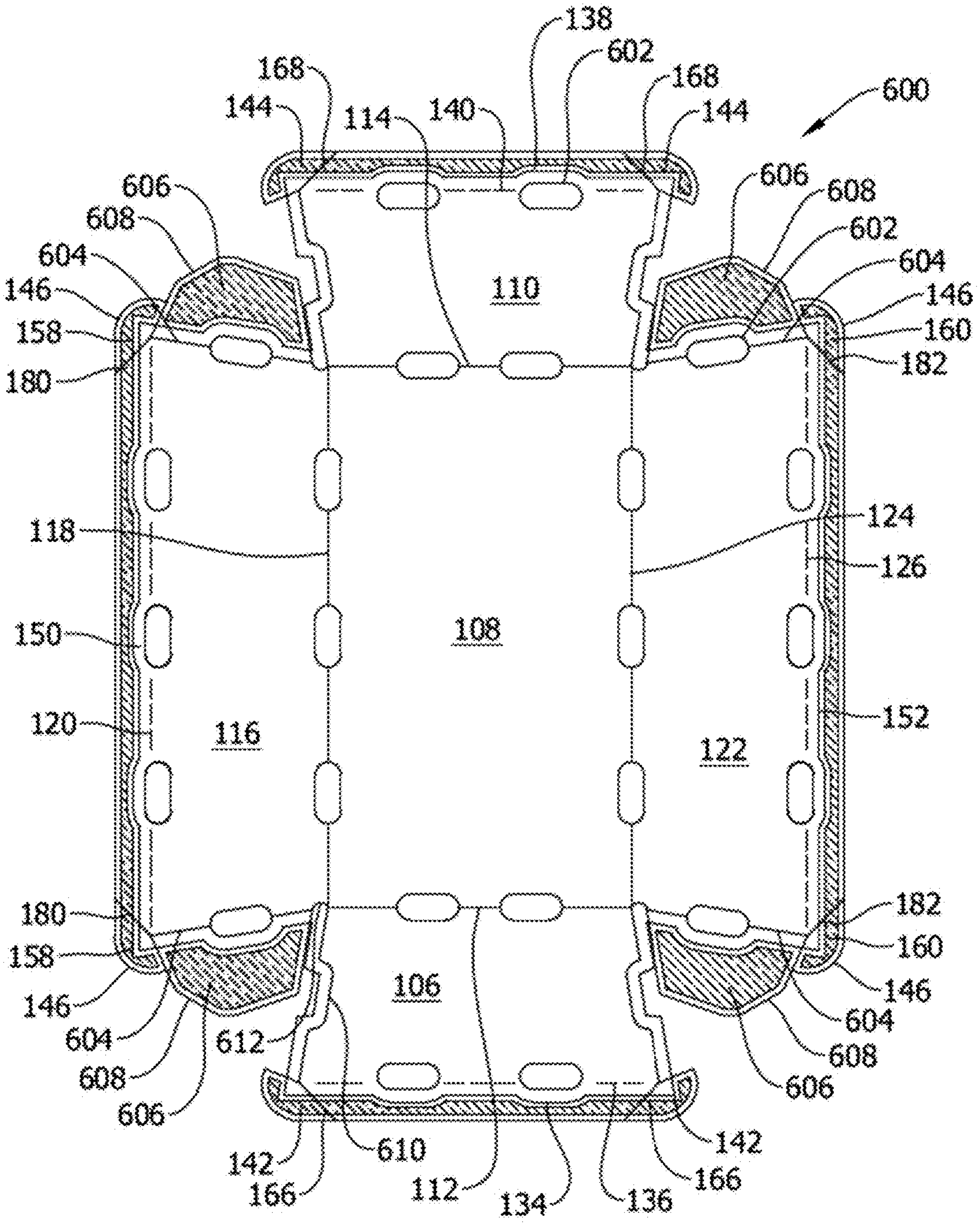
FIG. 6 is a top plan view of another embodiment of a blank of sheet material for forming a container in accordance with the present disclosure.

FIG. 6 is a top plan view of an alternative blank 600 of sheet material for forming a container. Blank 600 is substantially similar to blank 100 (shown in FIG. 1), except as noted below. As such, components common to blank 100 and blank 600 are labeled with the same reference symbols.

In one embodiment, blank 600 includes cutouts 602 extending along fold lines 112, 114, 118, 124, 120, 126, 136, and 140. Additionally, fold lines 604 between side panels 116, 122 and interior end panels 606 (described further herein) also have cutouts 602 extending therethrough. In the example embodiment, cutouts 602 have a general “stadium” shape. In alternative embodiments, blank 600 may include any suitable number of cutouts 602 having any suitable shape that enables blank 600 and/or any container formed therefrom to function as described herein.

In one embodiment, blank 600 also includes interior end panels 606 extending end edges of first side panel 116 and second side panel 122, along fold lines 604, rather than interior side panels 130 as in blank 100. As such, in the example embodiment, blank 600 includes four interior end panels 606. In the example embodiment, interior end panels 606 have a different overall shape than the interior side panels 130 of blank 100. In the example embodiment, interior end panels 606 have a free edge 608 opposing fold line 604, where free edge 608 includes a plurality of linear and/or curved portions. In alternative embodiments, one or more of free edge 608 may have any suitable shape that enables blank 600 and/or any container formed therefrom to function as described herein.

In the example embodiment, each end panel 106, 110 has notches 610 formed in the side edges thereof. In the example embodiment, once container 700 is formed from blank 600, notches 610 accommodate cutouts 602 in interior end panels 606 of blank 600. That is, when formed, notches 610 prevent end panels 106, 110 from overlapping cutouts 602 in interior end panels 606.

Additionally, blank 600 includes notches 612 formed in side panels 116, 122, between bottom edges of interior end panels 606 and fold lines 118/124. Notches 612 may facilitate folding and/or the joining or mating of respective flange panels and/or flange tabs.

In this example embodiment, end flange tabs 142, 144, and side flange tabs 158, 160 of blank 600 do not include notches 182/184 and are of a different general shape than the flange tabs in blank 100. In blank 600, each flange tab 142, 144, 158, 160 has a respective free edge 146 that includes curved and straight portions. Additionally, fold lines 166, 168, 180, 182 that bound each flange tab 142, 144, 158, 160 are angled such that each flange tab 142, 144, 158, 160 can be folded oblique to its respective flange panel 134, 138, 150, 152.

A container formed from blank 600 is formed in a similar manner as container 200, with interior end panels 606 of blank 600 folded in a similar manner to interior side panels 130 of blank 100, but coupled to end panels 106, 110 instead of side panels 116, 122.

Figure 7:
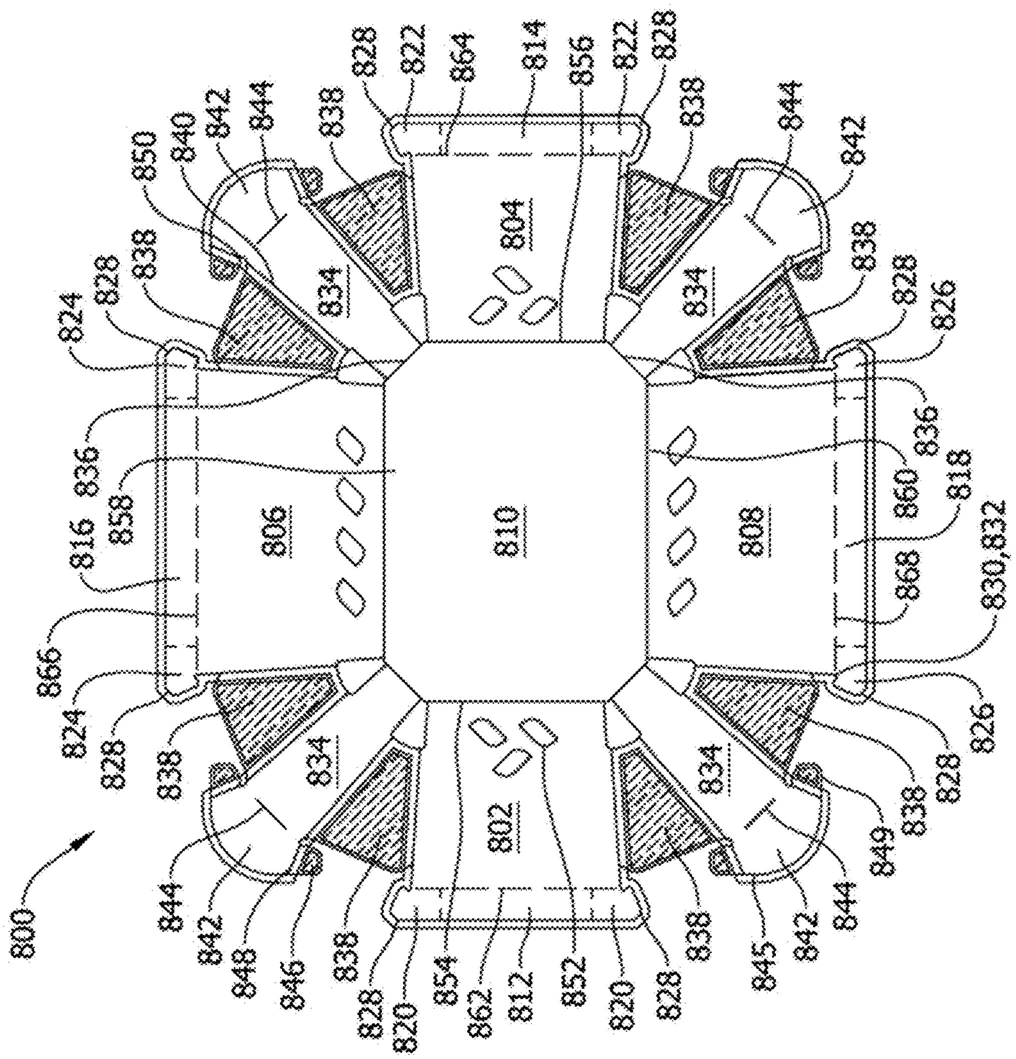
FIG. 7 is a top plan view of another embodiment of a blank of sheet material for forming a container in accordance with the present disclosure.

FIG. 7 is a top plan view of an alternative blank 800 of sheet material for forming a container.

In the example embodiment, similar to blank 100, blank 800 includes a first end panel 802, a second end panel 804, a first side panel 806, a second side panel 808, and a bottom panel 810. First end panel 802, second end panel 804, first side panel 806, and second side panel 808 each have a general trapezoidal shape, and bottom panel 810 has a general rectangular shape with chamfered corners. Thus, in the example embodiment, bottom panel 810 has eight edges. Blank 800 also includes a first end flange panel 812, a second end flange panel 814, a first side flange panel 816, and a second side flange panel 818, as well as first end flange tabs 820, second end flange tabs 822, first side flange tabs 824, and second side flange tabs 826, similar to blank 100.

In the example embodiment, flange tabs 820, 822, 824, 826 of blank 800 have a different size and overall shape than the flange tabs of blank 100. In particular, flange tabs 820, 822, 824, 826 each have a respective free end edge 828 that includes a plurality of straight and/or curved lines. In the example embodiment, flange tabs 820, 822, 824, 826 also each include a respective notch 830 located on the respective inside edge 832 thereof. Flange tabs 820, 822, 824, 826 may have any suitable shape that enables blank 800 and/or container 900 to function as described herein.

In the example embodiment, blank 800 also includes corner panels 834 that extend from fold lines 836, at the chamfered or angled corners of bottom panel 810. Interior corner panels 838, also referred to as glue panels, extend from each side edge of each corner panel 834. As such, in the example embodiment, blank 800 includes eight interior corner panels 838. Each interior corner panel 838 extends from a side edge of a respective corner panel 834 at a fold line 840 (only one fold line 840 is labeled on FIG. 7 for clarity).

Corner panels 834 of blank 800 also each include corner flange panel 842. Each corner flange panel 842 extends from a respective fold line 844, at the top of the respective corner panel 834, to a free edge 845. Corner flange tabs 846 that extend from each end edge of each corner flange panel 842. In the example embodiment, corner flange tabs 846 are bounded by fold lines 848 respectively, as well as a free edge 849. In the example embodiment, corner flange tabs 846 also include a notch 850 defined in inside edges thereof. The fold lines 848 that bound each corner flange tab 846 are angled such that each corner flange tab 846 can be folded oblique to its respective corner flange panel 842. In other embodiments, fold lines 848 may have any orientation that enables blank 800 and/or container 900 to function as described herein.

In the example embodiment, similar to blank 100, first end panel 802, second end panel 804, first side panel 806, and second side panel 808 include a plurality of cutouts 852 defined therein. Specifically, first and second end panels 806, 808 each include three cutouts 852 located near fold lines 854, 856, and first and second side panels 806, 808 each include four cutouts 852 located near fold lines 858, 860. Alternatively, blank 800 may include any suitable number of cutouts 852 of any suitable shape and/or in any suitable location that enables blank 800 and/or container 900 to function as described herein.

In some embodiments, portions of flange tabs 820, 822, 824, 826, 846 have reduced thickness, such that when the container 900 is formed from the blank 800, the corners 918 of flange 914 (see FIG. 8) formed from the coupled flange tabs have improved de-nesting characteristics. The thickness of the flange tabs 820, 822, 824, 826, 846 may be reduced by scoring, compressing, crushing, and the like, of one or more portions of the flange tabs.

Figure 8:
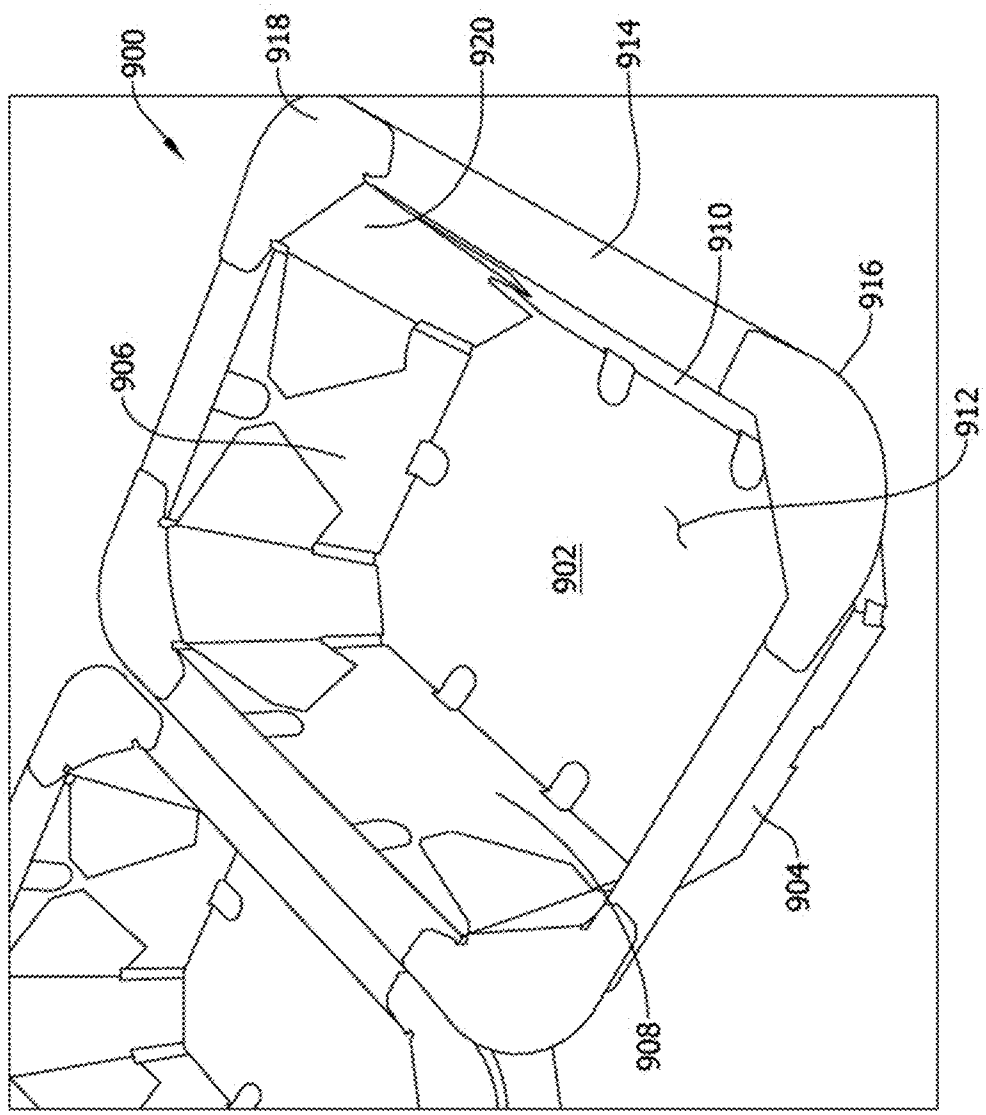
FIG. 8 is a perspective view of an example container formed from the blank shown in FIG. 7.

FIG. 8 is a perspective view of an example eight-sided container 900 formed from blank 800 (shown in FIG. 7). Container 900 includes a bottom wall 902, first and second opposing end walls 904, 906, first and second opposing side walls 908, 910, and four angled corner walls 920. Generally, bottom wall 902 includes bottom panel 810 of blank 800, first end wall 904 includes first end panel 802 and two interior corner panels 838, second end wall 906 includes second end panel 804 and two interior corner panels 838, first side wall 908 includes first side panel 806 and two interior corner panels 838, second end wall 910 includes second side panel 808 and two interior corner panels 838, and each corner wall 920 includes one of corner panels 834. End walls 904, 906, side walls 908, 910, corner walls 920, and bottom wall 902 define a cavity 912 of container 900, for receiving and retaining product (not shown) therein. Like container 200, the walls of container 900 are oriented obliquely, at angles of more than 90 degrees, with respect to bottom wall 902. In the example embodiment, bottom wall 902 of container 900 has a general rectangular shape with straight chamfered corners. Thus, bottom wall 902 of container includes eight sides. Alternatively, container 900 may have any suitable shape and or dimensions enable blank 800 and/or container 900 to function as described herein.

Container 900 also includes a flange 914 extending from the top of walls 904, 906, 908, 910, 920. In the example embodiment, flange 914 extends outwardly, or away from cavity 912, and is bounded by a free edge 916 that includes both straight and arcuate segments; specifically, corners 918 of flange 914, formed by corner flange panels 842, are generally arcuate. In the example embodiment, flange 914 is oriented parallel to bottom wall 902. Due to the orientation of the walls of container 900, flange 914 is oriented oblique to walls 904, 906, 908, 910, 920. Alternatively, flange 914 may extend in any direction and have any suitable shape that enables container 900 to function as described herein.

Container 900 is formed by folding the various panels and tabs of blank 800 along respective fold lines. Specifically, corner panels 834 are rotated inwardly (towards bottom panel 810) about fold lines 836, and interior corner panels 838 are rotated inwardly (towards the respective corner panel 834) about fold lines 840. First side panel 806 is rotated about fold line 858 towards an interior surface of bottom panel 810, and second side panel 808 is rotated about fold line 860 towards the interior surface of bottom panel 810. Each of first side panel 806 and second side panel 808 is coupled to two respective interior corner panels 834 using an adhesive, such as holt-melt adhesive, to form side walls 908, 910. First end panel 802 is rotated about fold line 854 towards the interior surface of bottom panel 810, and second end panel 804 is rotated about fold line 856 towards the interior surface of bottom panel 810. Each of first end panel 802 and second end panel 804 is coupled to two respective interior corner panels 838 using an adhesive, such as hot-melt adhesive, to form end walls 904, 906. First side panel 806, second side panel 808, first end panel 802, and second end panel 804 may be rotated about fold lines 858, 860, 854, 856, respectively, and attached to interior corner panels 838 in any order that enables blank 800 and/or container 900 to function as described herein.

In addition, substantially simultaneously to the forming of the walls of container 900 (e.g., within a same forming step), end flange panels 812, 814 and side flange panels 816, 818 are rotated outwardly (e.g., away from bottom wall 902), until flange panels 812, 814, 816, 818 are parallel to bottom wall 902. This rotation of flange panels 812, 814, 816, 818 results in simultaneous rotation of flange tabs 820, 822, 824, 826 into the parallel orientation with respect to bottom wall 202.

In a separate step (e.g., after a predetermined amount of time has passed, which may be milliseconds to seconds), corner flange panels 842 are rotated outwardly about fold lines 844, until corner flange panels 842 are substantially parallel to bottom panel 810. Rotation of corner flange panels 842 results in simultaneous rotation of corner flange tabs 846 into the parallel orientation with respect to bottom wall 202. Moreover, this rotation of corner flange panels 842 also couples corner flange tabs 846 in an overlapping relationship with end and side flange tabs 820, 822, 824, 826 (which are already in their final position, having been previously rotated).

Notably, in the example embodiment, adhesive, such as hot-melt adhesive, is applied to the interior surface of end and side flange tabs 820, 822, 824, 826 prior to the formation of container 900. Accordingly, when corner flange panels 842 are rotated subsequent to end and side flange panels 812, 814, 816, 818 being rotated, the exterior surface of corner flange tabs 846 is coupled against and adhered to the interior surface of corresponding end and side flange tabs 820, 822, 824, 826.

When formed using the method described herein, container 900 includes the same advantages as container 200. Specifically, flange 914, also referred to as a "top flange," is substantially flat or planar, and is more secure compared to conventional flanges that are not glued, or are not glued until the container is sealed. In at least some instances, where any flange tabs 820, 822, 824, 826 and/or 846 feature a reduced thickness, the overall flange 914 may be even more desirably planar, which may in turn improve the sealing characteristics and/or rigidity of container 900.

Once formed, containers 900 are nested or stacked for storage and/or transport thereof. In some instances, these containers 900 are ultimately used to retain a variety of objects. In some embodiments, a stack of containers 900 is delivered to a filling location, at which individual containers 900 are retrieved from the stack. As described herein, flange corners 918 of container 900, including flange tabs 820, 822, 824, 826 and/or 846 that are embossed and/or feature reduced thickness, may improve the de-nesting characteristics of container 900.

The open, empty, and de-nested containers 900 are then filled with a product (e.g., produce). A film (not shown) is placed across the top of container 900 and sealed against flange 914 to form a seal. The film may be coupled and adhered to flange 914 using any suitable method or material (e.g., adhesive, heat-sealing, etc.). As described elsewhere herein, flange 914 of container 900 provides structural advantages over flanges of similar conventional containers. Namely, the application of adhesive to end and side flange tabs 820, 822, 824, 826 to couple corner flange tabs 846 to end and side flange tabs 820, 822, 824, 826 during the initial formation of container 900 increases both the structural integrity and sealing ability of container 900. Conventional containers may have atop flange, but, as described above, such conventional containers are not formed in the same way as container 900 (i.e., do not include a formed flange or do not apply adhesive to join flange tabs during initial container formation), and therefore container 900 provides improvements over known conventional containers.

The application of adhesive when coupling end and side flange tabs 820, 822, 824, 826 to corner flange tabs 846 reinforces and strengthens corners 918 of flange 914, thus enhancing the structural rigidity of container 900. For example, container 900 may be able to hold a greater weight of a product and/or more effectively prevent leakage of liquid. Such enhancement may also reduce the risk of structural failure of container 900 once filled and sealed. Additionally, such reinforcement facilitates improved sealing of container 900. Moreover, flange 914 may be substantially flatter than flanges of conventional containers. Such flanges 914 enables easier, faster, simpler, and/or more cost-effective (e.g., using less sealing material) application of a sealing film to seal container 900. These enhancements enable container 900 to function more effectively than other conventional containers.

Figure 22:
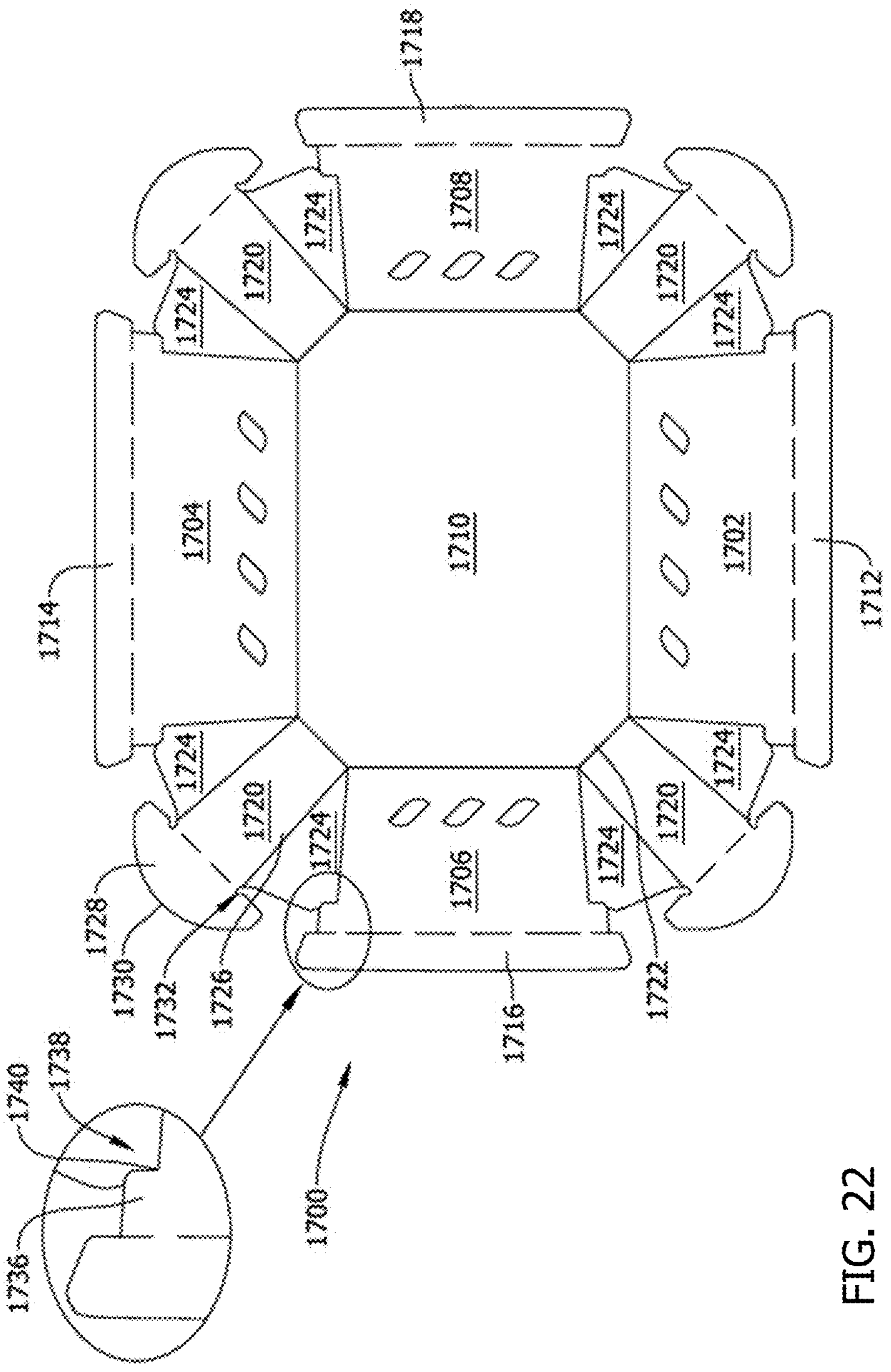
FIG. 22 is a top plan view of another embodiment of a blank of sheet material for forming a container in accordance with the present disclosure.
Figure 23:
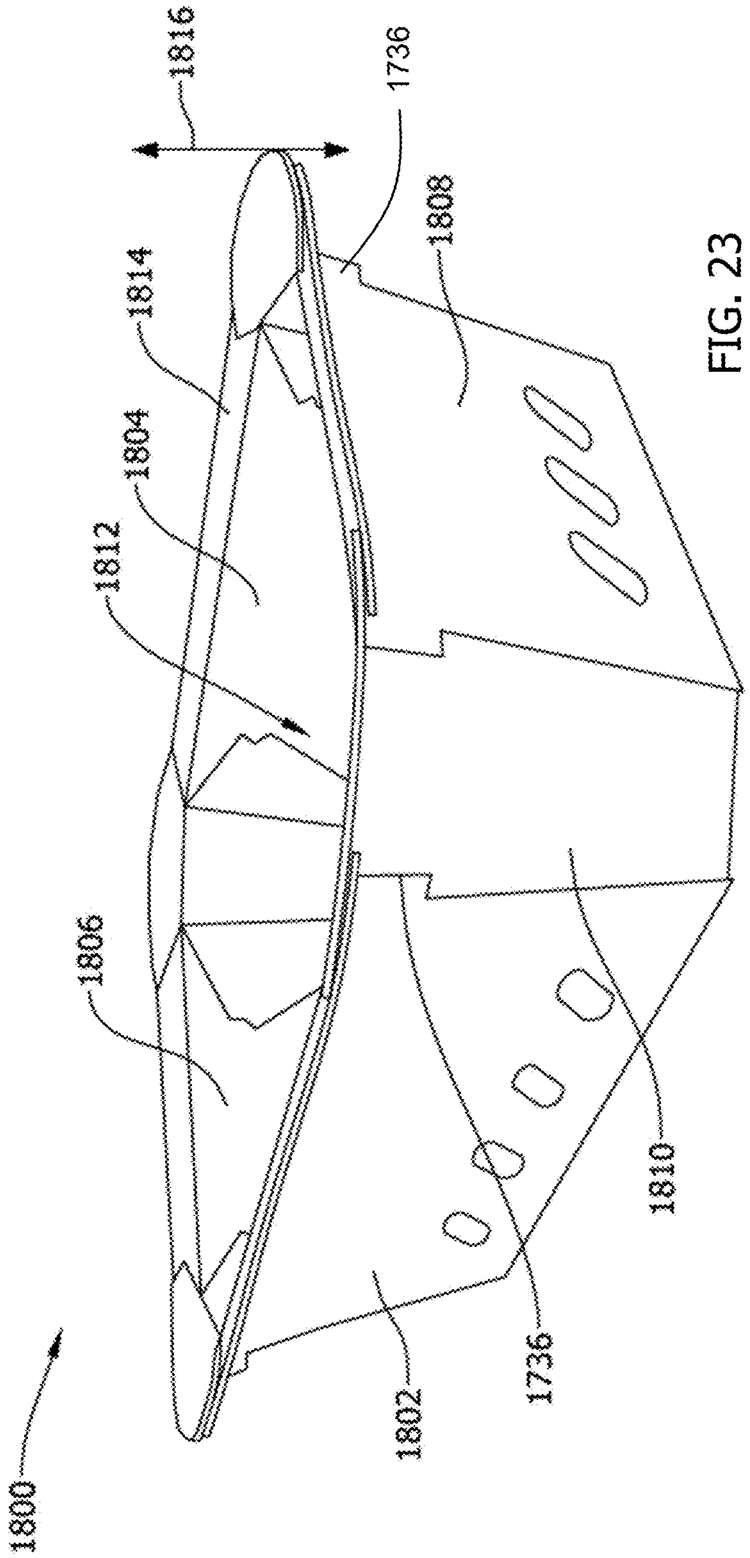
FIG. 23 is a perspective view of an example container formed from the blank shown in FIG. 22.

FIG. 22 is atop plan view of an alternative blank 1700 for forming a container 1800 (see FIG. 23).

In the example embodiment, similar to blank 800, blank 1700 includes a first end panel 1702, a second end panel 1704, a first side panel 1706, a second side panel 1708, and a bottom panel 1710. The bottom panel 1710 has a generally rectangular shape with chamfered corners, giving it eight edges in the example embodiment. Blank 1700 also includes a first end flange panel 1712, a second end flange panel 1714, a first side flange panel 1716, and a second side flange panel 1718.

Blank 1700 also includes corner panels 1720 that extend from fold lines 1722 at the chamfered corners of bottom panel 1710. Interior corner panels 1724 extend from each side edge 1726 of each corner panel 1720. Each corner panel 1720 further includes a corner flange tab 1728 which includes a curved outer edge 1730 and additionally forms a notch 1732 on the inside edge adjacent to the corner panel 1720. The corner flange tabs 1728 may have any suitable shape that enables blank 1700 and/or container 1800 to function as described herein. Each of the first and second end panels 1702, 1704 and the first and second side panels 1706, 1708 further includes de-nesting tabs 1736 located on either side of each respective panel 1702, 1704, 1706, 1708. The de-nesting tabs 1736 are provided adjacent to the flange panels 1712, 1714, 1716, 1718. In the example embodiment, eight de-nesting tabs 1736 are included, though other embodiments could include any suitable number of de-nesting tabs. The de-nesting tabs 1736 extend out away from the respective panel 1702, 1704, 1706, 1708 and along flange panels 1712, 1714, 1716, 1718. An indent 1738 is defined along a bottom edge 1740 of the de-nesting tab 1736.

FIG. 23 is a perspective view of an example eight-sided container 1800 formed from blank 1700 (shown in FIG. 22). Container 1800 is substantially similar to container 900 (shown in FIG. 8), and is formed from blank 1700 using a method similar to forming container 900 from blank 800. Container 1800 may have different dimensions than container 900 and further includes de-nesting tabs 1736. Container 1800 includes a bottom wall (not shown), first and second end walls 1802, 1804, first and second side walls 1806, 1808, and four corner walls 1810. The bottom wall (not shown) includes bottom panel 1710. First end wall 1802 includes first end panel 1702 and two interior corner panels 1724. Second end wall 1804 includes second end panel 1704 and two interior corner panels 1724. First side wall 1806 includes first side panel 1706 and two interior corner panels 1724. Second side wall 1808 includes second side panel 1708 and two interior corner panels 1724. End walls 1802, 1804, side walls 1806, 1808, corner walls 1810, and the bottom wall (not shown) form a cavity 1812. Container 1800 also has a flange 1814 extending from the top of walls 1802, 1804, 1806, 1808, 1810. The flange 1814 extends transversely outward from the cavity 1812.

Container 1800 includes de-nesting tabs 1736 which extend out from each end of each wall 1802, 1804, 1806, 1808 in the plane of the respective wall 1802, 1804, 1806, 1808 at an acute angle with regard to the corner walls 1810. The de-nesting tabs 1736 do not extend beyond the plane 1816 defined by the edge of the flange 1814.

Figure 20:
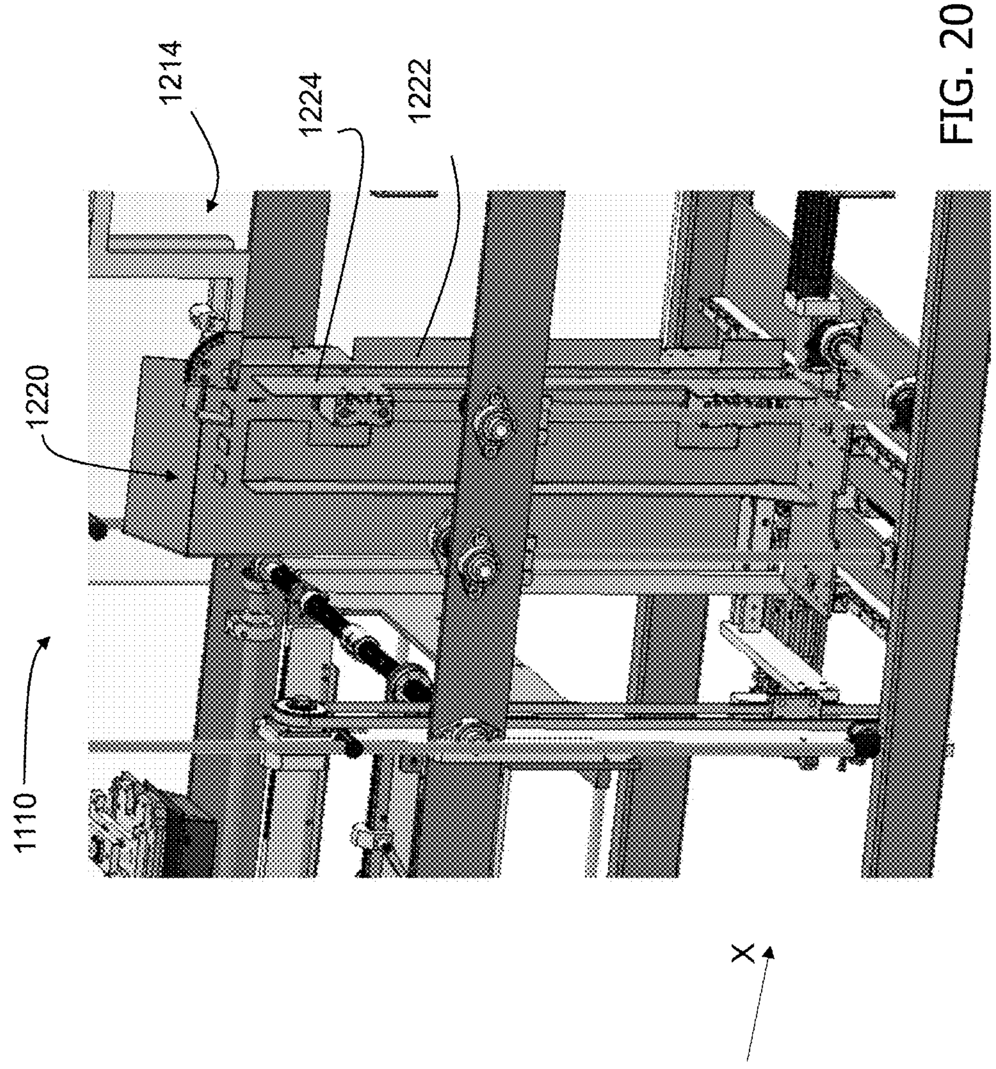

FIG. 20 is a perspective view of a stack 1900 of a plurality of containers 1800, wherein the containers 1800 are nested or stacked for storage and/or transport thereof. The bottom edge 1740 of each de-nesting tab 1736 rests along the top surface of the flange 1814 of the container 1800 therebeneath. This arrangement creates a spacing 1902 between each flange 1814 of each container 1800. The spacing 1902 is essentially equal between each container 1800 and is defined by the height of the de-nesting tab 1736. The space 1902 prevents the flanges 1814 from contacting each other directly. In some instances, the flanges 1814 may have excess glue from the process of forming the container 1800. Preventing the flanges from coming into contact prevents any excess glue from causing the containers 1800 to stick together in this stacked configuration. In other instances, the space 1902 may prevent the containers 1800 from becoming compressed and becoming stuck together. Once containers are compressed, it may result in additional friction between the surfaces of the containers 1800, making it more difficult to separate the containers 1800. Further, the sizing of the space 1902 can be selected to provide adequate clearance for a worker or machine to pull an individual container 1900 from the stack 1900, to allow for separating of the containers 1800 by a worker or machine.

Figure 25:
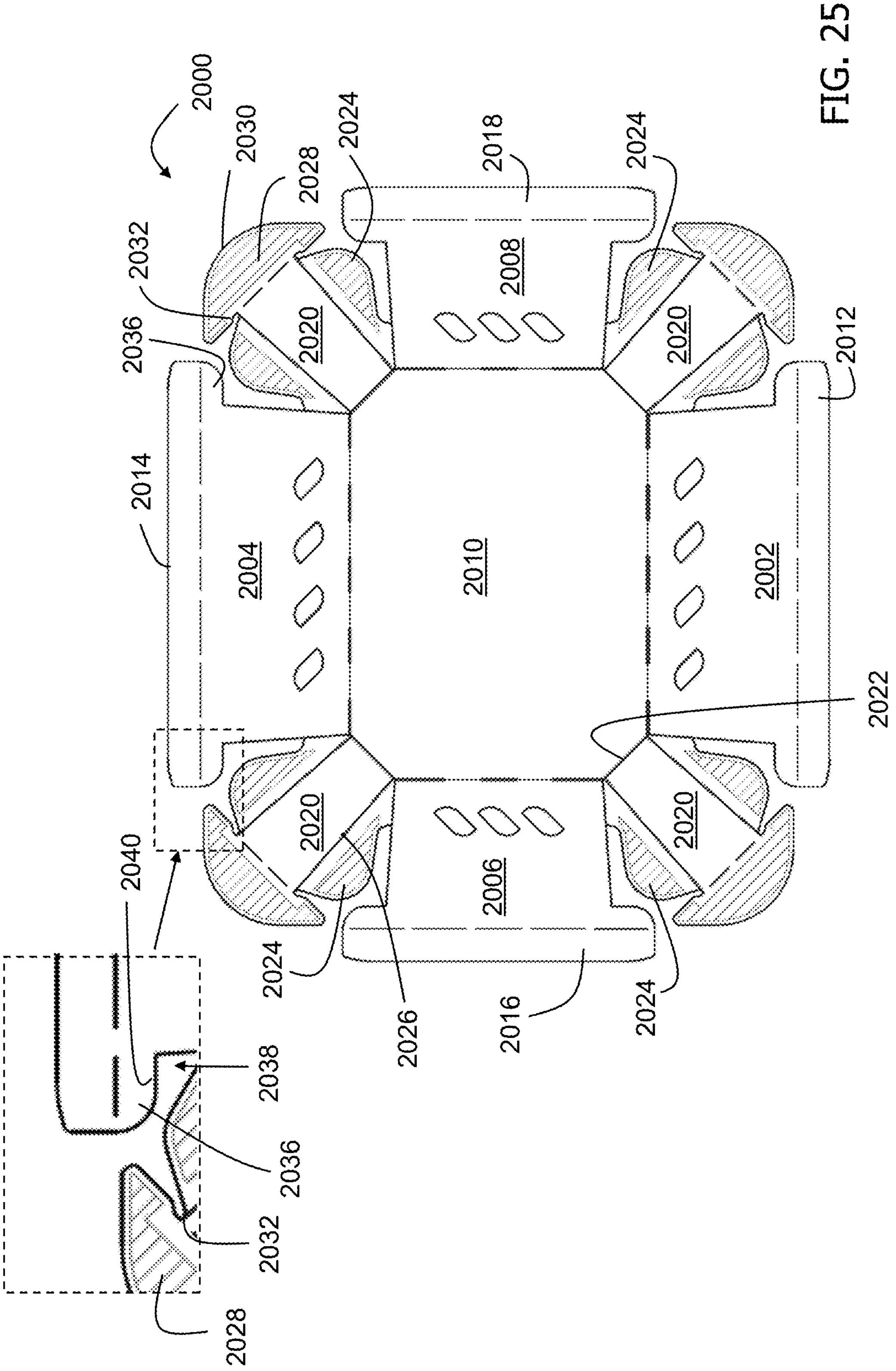
FIG. 25 is atop plan view of another embodiment of a blank of sheet material for forming a container in accordance with the present disclosure.
Figure 26:
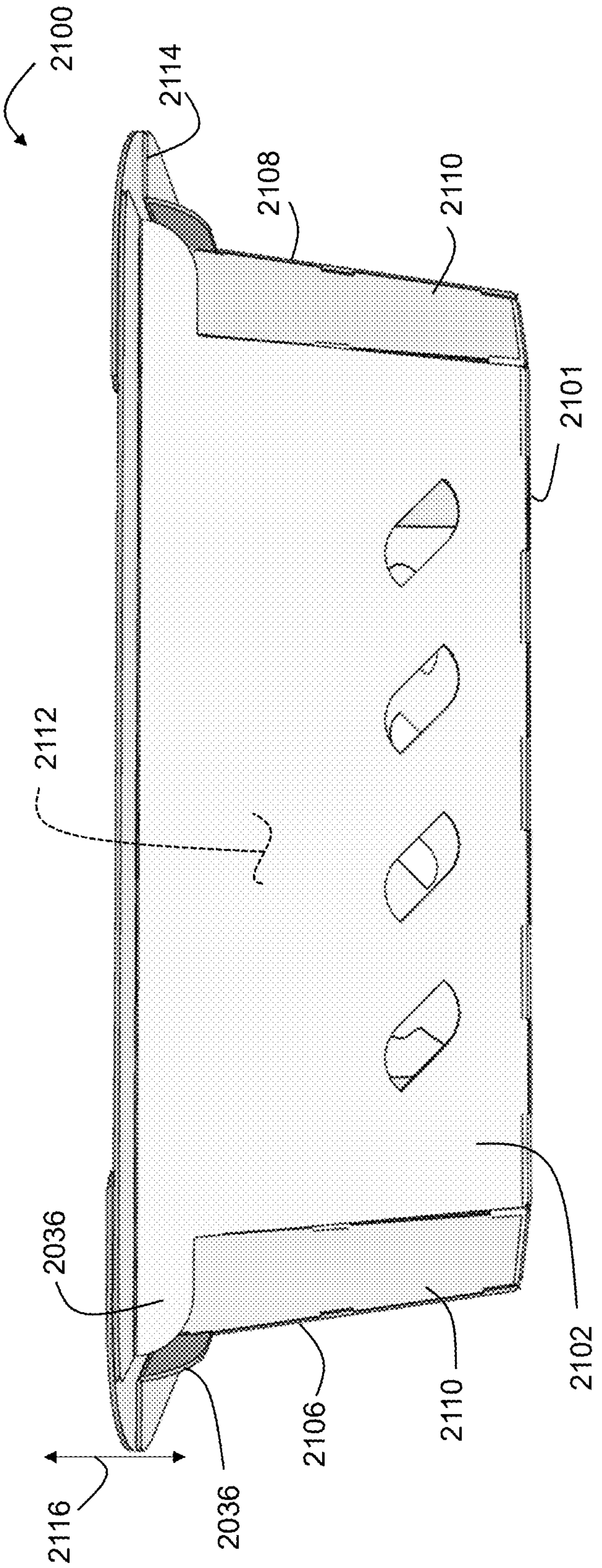
FIG. 26 is a side view of an example container formed from the blank shown in FIG. 25.

FIG. 25 is atop plan view of an alternative blank 2000 for forming a container 2100 (see FIG. 26).

In the example embodiment, similar to blank 800 and/or blank 1700, blank 2000 includes a first end panel 2002, a second end panel 2004, a first side panel 2006, a second side panel 2008, and a bottom panel 2010. The bottom panel 2010 has a generally rectangular shape with chamfered corners, giving it eight edges in the example embodiment. Blank 2000 also includes a first end flange panel 2012, a second end flange panel 2014, a first side flange panel 2016, and a second side flange panel 2018.

Blank 2000 also includes corner panels 2020 that extend from fold lines 2022 at the chamfered corners of bottom panel 2010. Interior corner panels 2024 extend from each side edge 2026 of each corner panel 2020. Each corner panel 2020 further includes a corner flange tab 2028 which includes a curved outer edge 2030 and additionally forms a notch 2032 on the inside edge adjacent to the corner panel 2020. The corner flange tabs 2028 may have any suitable shape that enables blank 2000 and/or container 2100 to function as described herein. Each of the first and second end panels 2002, 2004 and the first and second side panels 2006, 2008 further includes de-nesting tabs 2036 located on either side of each respective panel 2002, 2004, 2006, 2008. The de-nesting tabs 2036 are provided adjacent to the flange panels 2012, 2014, 2016, 2018. In the example embodiment, eight de-nesting tabs 2036 are included, though other embodiments could include any suitable number of de-nesting tabs. The de-nesting tabs 2036 extend out away from the respective panel 2002, 2004, 2006, 2008 and along flange panels 2012, 2014, 2016, 2018. An indent 2038 is defined along a bottom edge 2040 of the de-nesting tab 2036.

FIG. 26 is a side view of an example eight-sided container 2100 formed from blank 2000 (shown in FIG. 25). Container 2100 is substantially similar to container 900 (shown in FIG. 8) and/or container 1800 (shown in FIG. 23), and is formed from blank 2000 using a method similar to forming container 900 from blank 800. Container 2100 may have different dimensions than container 900 and further includes de-nesting tabs 2036. Container 2100 includes a bottom wall 2101, a first end walls 2102, an opposing second end wall (not shown), first and second side walls 2106, 2108, and four corner walls 2110 (only two of which are shown in FIG. 26). The bottom wall 2101 includes bottom panel 2010. First end wall 2102 includes first end panel 2002 and two interior corner panels 2024. The second end wall (not shown) includes second end panel 2004 and two interior corner panels 2024. First side wall 2106 includes first side panel 2006 and two interior corner panels 2024. Second side wall 2108 includes second side panel 2008 and two interior corner panels 2024. The end walls, side walls, corner walls, and bottom wall form a cavity 2112. Container 2100 also has a flange 2114 extending from the top of the end, side, and corner walls 2102, 2106, 2108, 2110. The flange 2114 extends transversely outward from the cavity 2112.

Container 2100 includes de-nesting tabs 2036 which extend out from each end of each end and side wall, in the plane of the respective wall and at an acute angle with regard to the corner walls 2110. The de-nesting tabs 2036 do not extend beyond a plane 2116 defined by the edge of the flange 2114.

Figure 9:
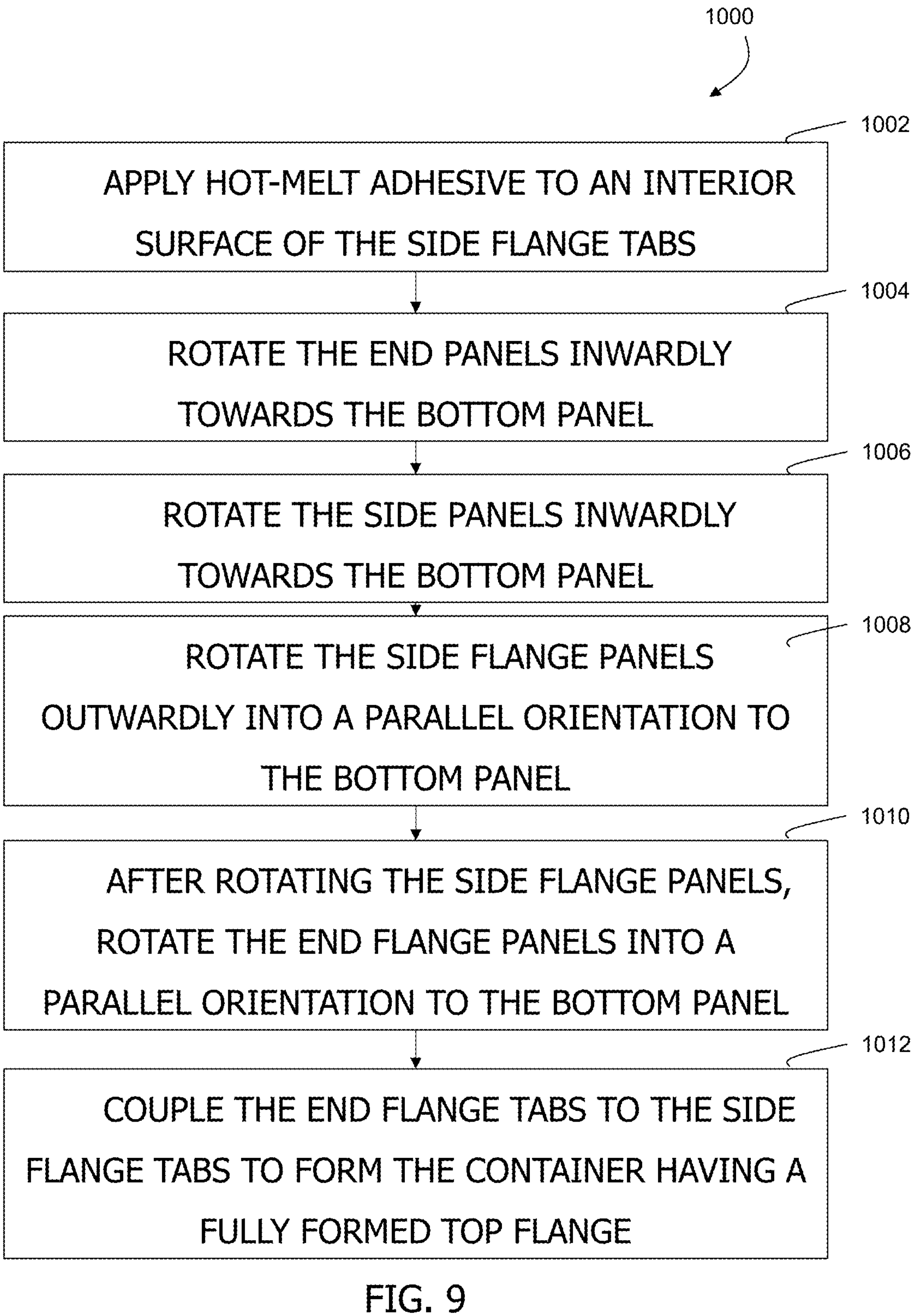
FIG. 9 is a flow diagram of a method of forming a container from a blank in accordance with the present disclosure.

FIG. 9 is a flow diagram of a method 1000 of forming a container from a blank. In some embodiments, the blank includes a bottom panel, two opposing side panels, two opposing end panels, a respective end flange panel extending from a top edge of each end panel, a respective end flange tab extending from each side edge of each end flange panel, a respective side flange panel extending from a top end of each side panel, and a respective side flange tab extending from each end edge of each side flange panel. Method 1000 includes applying 1002 hot-melt adhesive to an interior surface of the side flange tabs, rotating 1004 the end panels inwardly towards the bottom panel, and rotating 1006 the side panels inwardly towards the bottom panel. Method 1000 also includes rotating 1008 the side flange panels outwardly into a parallel orientation to the bottom panel, and after rotating 1008, rotating 1010 the end flange panels into a parallel orientation to the bottom panel. Method 1000 also include coupling 1012 the end flange tabs to the side flange tabs to form the container having a fully formed top flange.

In some embodiments, the blank further includes a respective interior side panel extending from each side edge of each end panel. In some such instances, method 1000 further includes applying hot-melt adhesive to a portion of an interior surface of the side panels, rotating the interior side panels inwardly, after said rotating the interior side panels, performing the rotating 1008, and coupling the side panels to the interior side panels.

Method 1000 may include additional, fewer, and/or alternative steps, including steps disclosed elsewhere herein.

Figure 10:
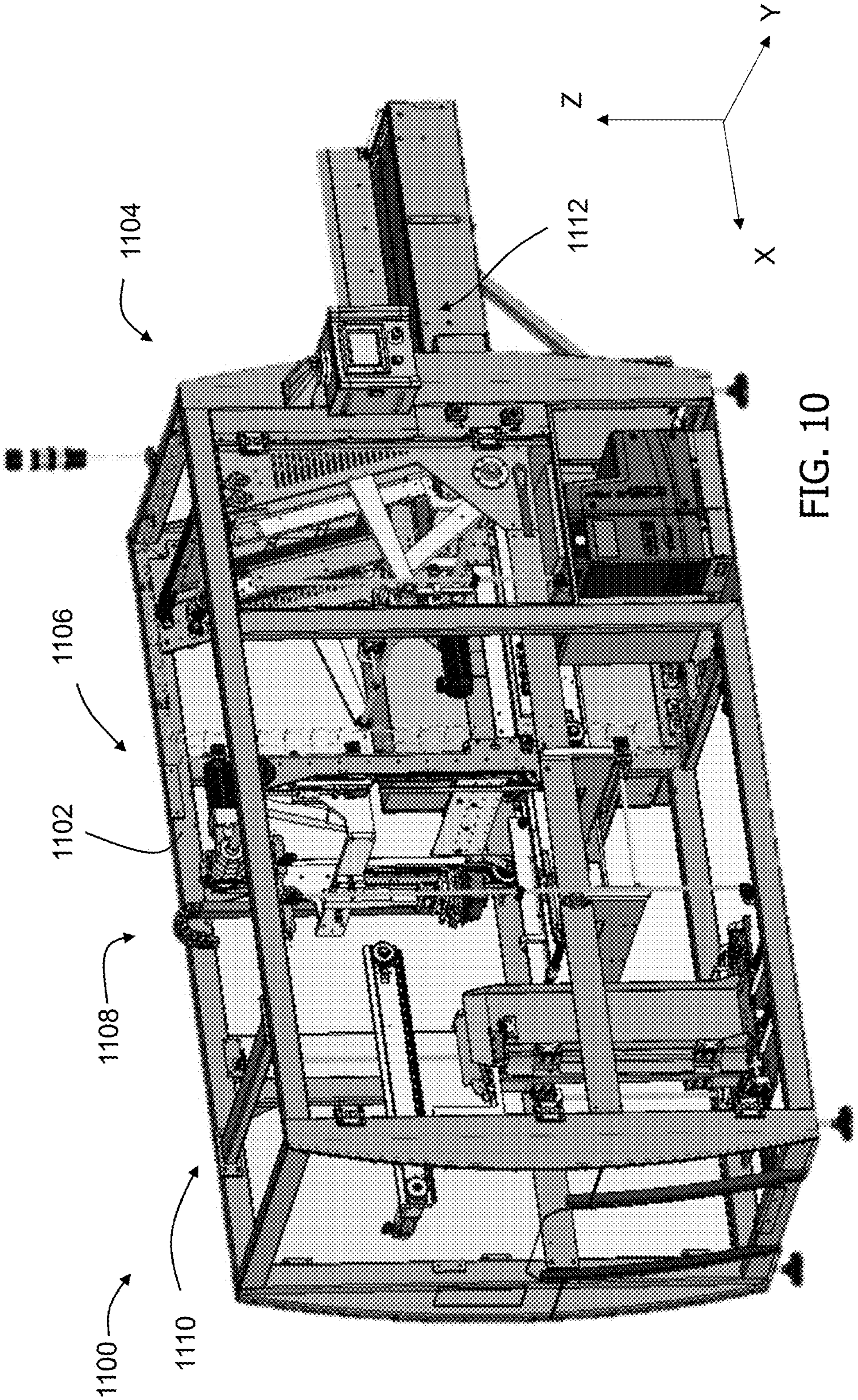
FIG. 10 is a perspective view of a container forming apparatus in accordance with the present disclosure.

FIG. 10 illustrates an exemplary container forming apparatus 1100 for forming a blank into a fully formed container or tray. For clarity, when describing a blank or features thereof, reference will be made to blank 100 (shown in FIG. 1) and features thereof. Likewise, for clarity, when describing a container or features thereof, reference will be made to container 200 (shown in FIG. 2) and features thereof. This discussion does not limit the disclosed apparatus 1100, as apparatus 1100 may be applicable to any blank or container described herein, as well as additional or alternative blanks and containers.

Container forming apparatus 1100 generally includes a frame 1102, a blank feeder station 1104, a transfer station 1106, a compression station 1108, a stacking station 1110, and a control system 1112. A direction X is generally referred to herein as a blank transfer direction X, and indicates the overall path taken by blank 100 through apparatus 1100. A direction Y is perpendicular to blank transfer direction X and is referred to herein as a lateral direction Y or transverse direction Y. A direction Z is perpendicular to both blank transfer direction X and lateral direction Y, and is referred to herein as a vertical direction Z.

FIGS. 11-15 illustrate blank feeder station 1104 in greater detail. Blank feeder station 1104 broadly includes a conveyor belt 1120, a guide fence 1122, a pick-and-place assembly 1124, and a deck 1126.

Figure 12:
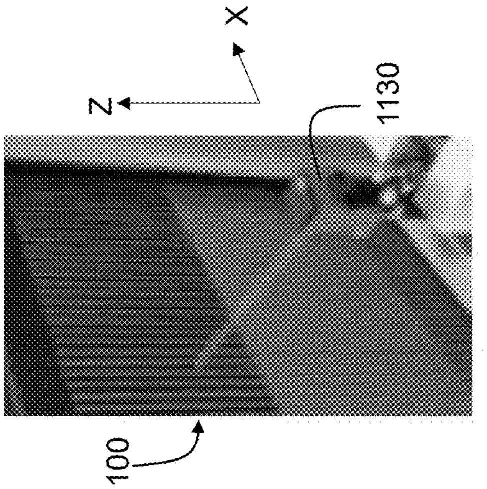
FIGS. 11-15 depict various views of a blank feed station of the container forming apparatus shown in FIG. 10.
Figure 11:
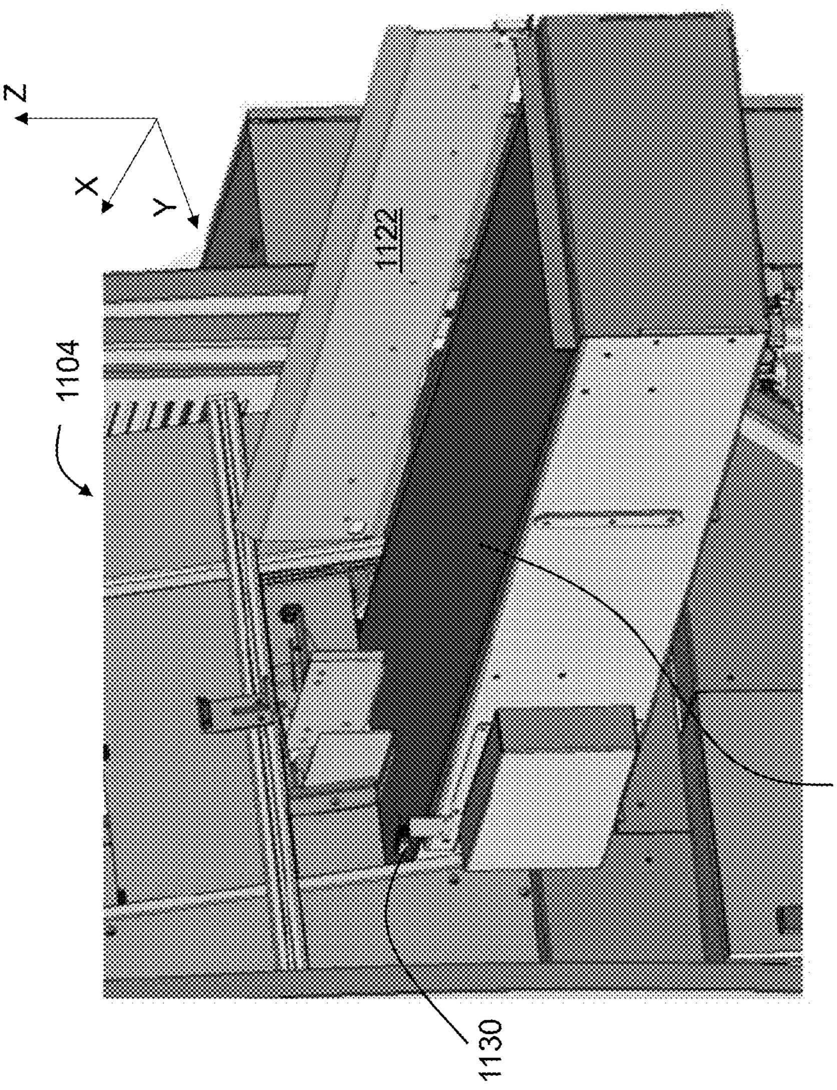
Figure 13:
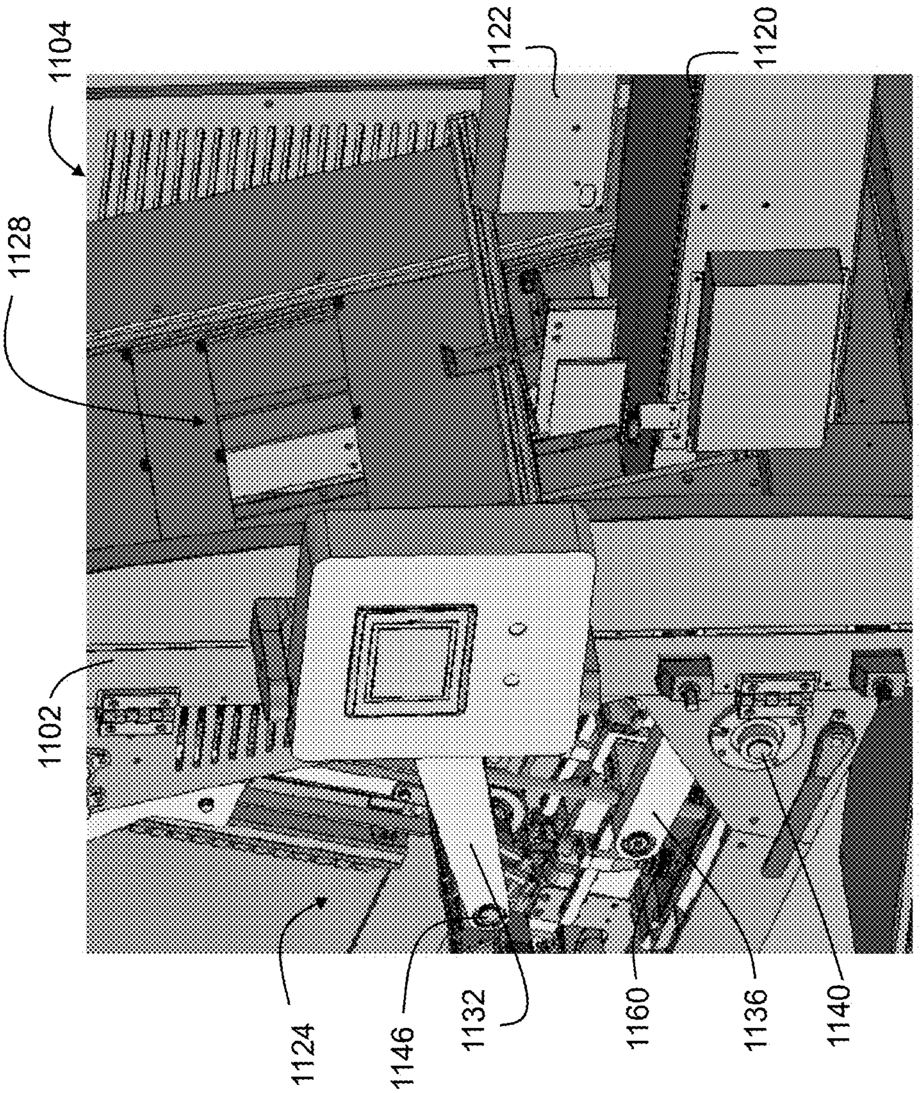

As generally shown in FIG. 12, blanks 100 are stacked such that each blank 100 extends in vertical direction Z, with one face towards blank transfer direction X and the other face opposing blank transfer direction X. Stated differently, blanks 100 are stacked "standing up" on a side or end edge thereof, on belt 1120.

Belt 1120 is driven (e.g., by a motor, not shown, operated by control system 1112) in blank transfer direction X at a parameterized rate, to drive a single blank 100 towards a pick window 1128 one at a time. It should be readily understood that this rate may be substantially infinitely adjusted between a predefined minimum and maximum rate, based on various parameters of apparatus 1100 and the subject blank (e.g., the size of the blank may affect how fast apparatus 1100 can operate). As blanks 100 are driven by belt 1120, they are maintained in their upright position by guide fence 1122.

In the example embodiment, blank feeder station 1104 also includes any suitable number and location of sensors to ensure blank feeder station 1104 is operating according to instructions from control system 1112. For instance, a sensor 1130 monitors the number of blanks 100 in the blank stack, and may transmit an alert when the number of blanks 100 falls below a threshold. In this way, uninterrupted operation may be facilitated (e.g., by facilitating a refill of blanks 100 before the stack is empty, which would disrupt operation of apparatus 1100). Other sensors may be used, for instance, to ensure blanks 100 do not fall out of their "standing" position, are moving in the proper direction, are moving at the proper speed, and the like, for operational and/or safety purposes.

Blanks 100 are transferred from their vertical orientation and deposited onto deck 1126 in a horizontal orientation by pick-and-place assembly 1124. Pick-and-place assembly 1124 includes stationary arms 1132 coupled to frame 1102 at first ends 1134 thereof, and pivoting arms 1136 pivotably coupled to frame 1102 at first ends 1138 thereof. In particular, first ends 1138 of pivoting arms 1136 are coupled to frame 1102 via a first pivot rod 1140, which rotates about a first pivot axis 1142 defined in lateral direction Y. A servomotor 1144 controls the pivoting motion of pivot arms 1136 about first pivot axis 1142.

A second pivot rod 1146 is coupled between second ends 1148 of stationary arms 1132, and rotates about a second pivot axis 1150 defined parallel to first pivot axis 1142, in lateral direction Y. A vacuum assembly 1152 is coupled to second pivot rod 1146. Vacuum assembly 1152 is also pivotably coupled to second ends 1154 of pivoting arms 1136 via a cylinder 1156. Cylinder 1156 pivots about a third pivot axis 1157. Bars 1158 couple cylinder 1156 to second pivot rod 1146. Vacuum assembly 1152 includes a plurality of vacuum suction cups 1160, which are activated to initiate a suction operation, when picking up a blank 100, and are deactivated when dropping or placing blank 100. Vacuum suction cups 1160 are operatively coupled to internal conduits (not shown) whose internal pressure is monitored and controlled, for example, by control system 1112.

Figure 14:
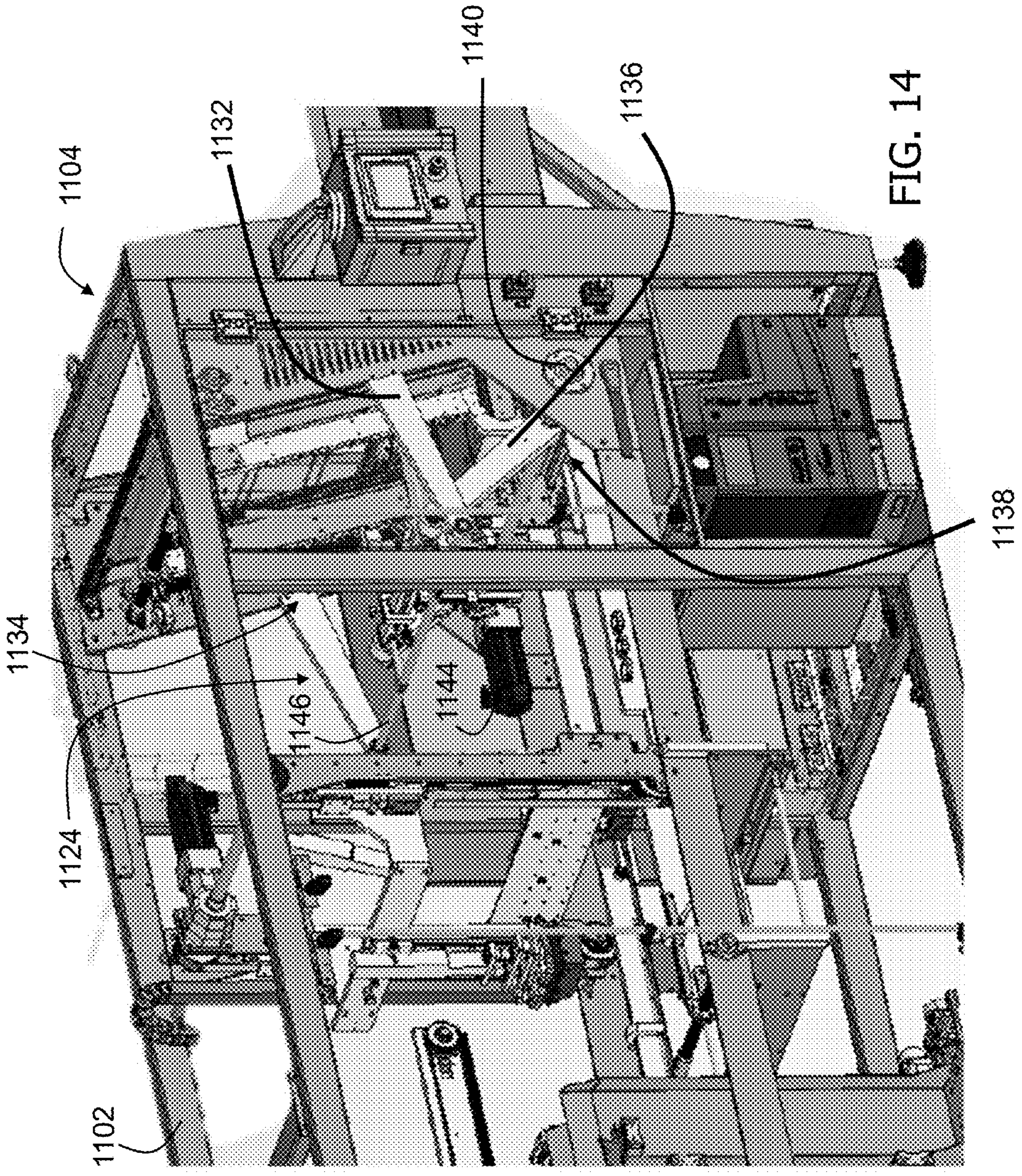

With reference to FIG. 14, for example, pick-and-place assembly 1124 is shown in a first, "pick" configuration. Pivoting arms 1136 are in a first position, and vacuum assembly 1152 is in a first position in which vacuum suction cups 1160 are facing the vertically oriented blanks 100. Vacuum suction cups 1160 are placed into engagement with a face of a single blank 100 and activated, such that blank 100 is drawn and maintained against vacuum suction cups 1160.

Figure 15:
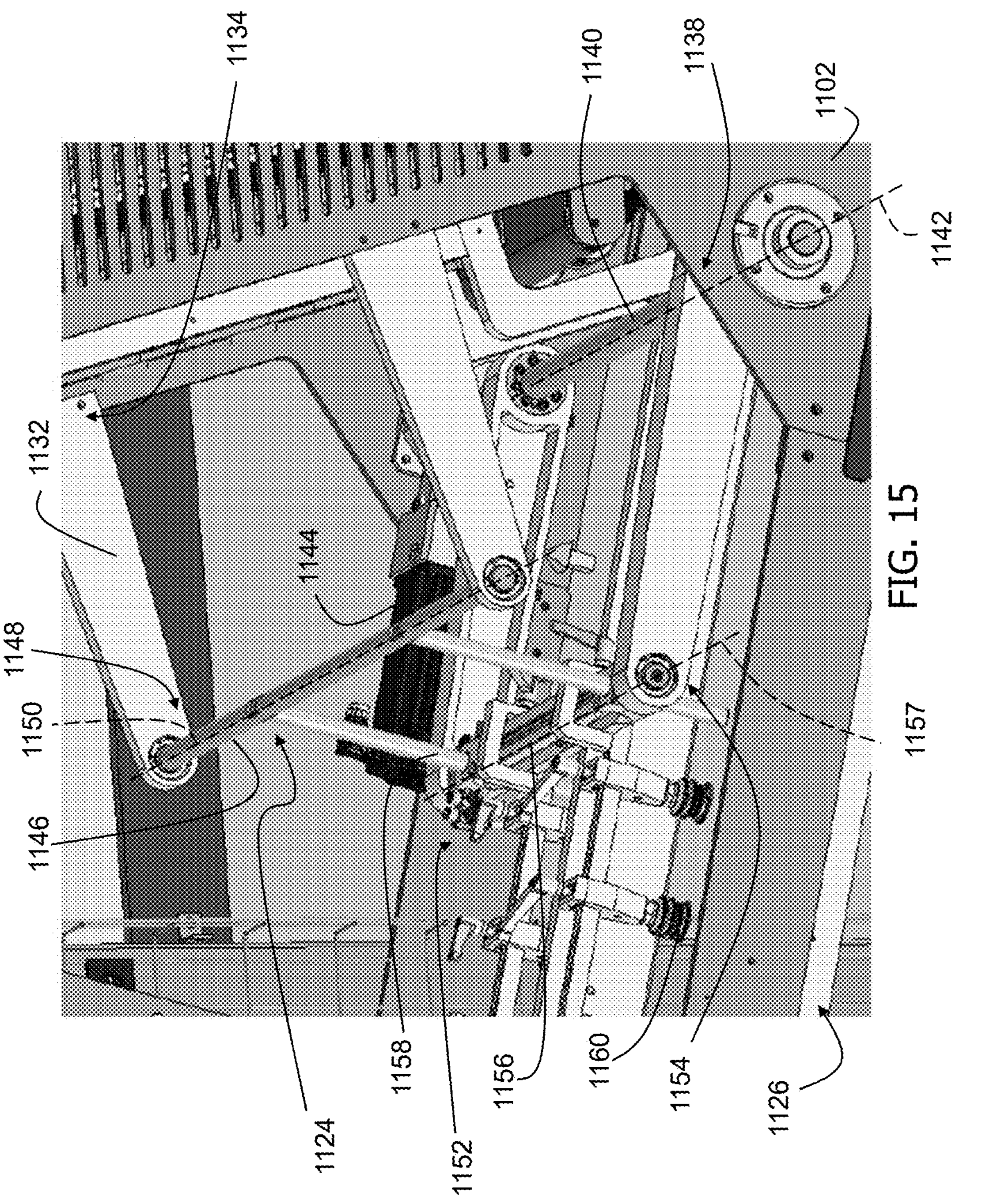

With reference now to FIG. 15, once blank 100 has been picked from the blank stack, pivoting arms 1136 are pivoted about first pivot axis 1142 into a second position, and vacuum assembly 1152 is rotated into a second position. In particular, vacuum assembly 1152 is both lowered by pivoting arms 1136 and pivoted about second and third pivot axes 1150, 1157 (due to the connection between cylinder 1156, bars 1158, and second pivot rod 1146) such that vacuum suction cups 1160 are facing downwardly, and blank 100 is positioned horizontally.

Vacuum suction cups 1160 are deactivated, and blank 100 is released onto deck 1126. Although not specifically shown, when blank 100 is deposited on deck 1126, leading edge 102 (see FIG. 1) is facing in blank transfer direction X, and interior surface 101 (see FIG. 1) is facing upwards, in vertical direction Z (such that exterior surface 103 (see FIG. 1) is facing downwards, against deck 1126).

Figure 16:
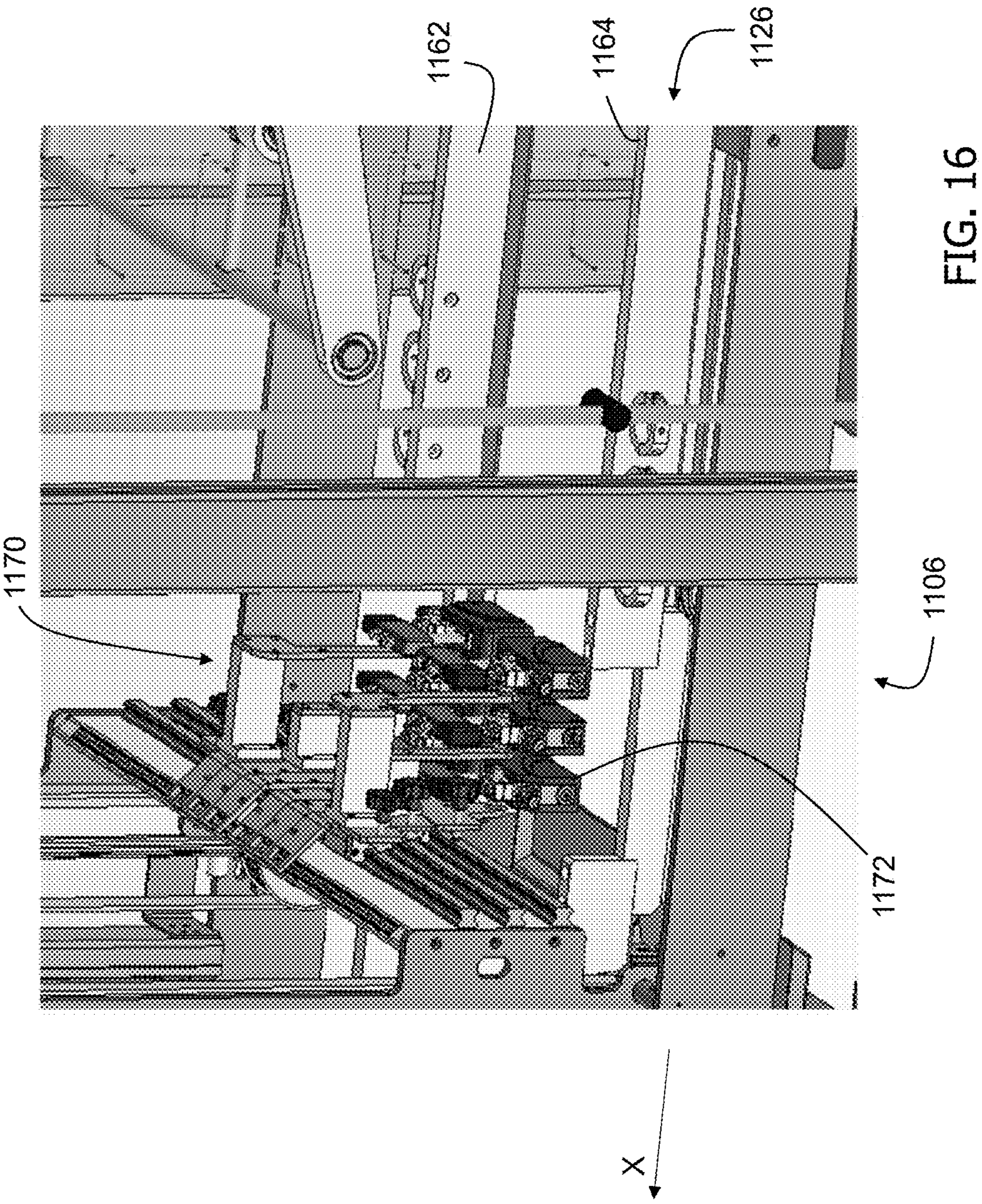
FIG. 16 depicts a blank transfer station of the container forming apparatus shown in FIG. 10.

Turning to FIG. 16, deck 1126 extends in blank transfer direction X from blank feeder station 1104 through blank transfer station 1106. In the illustrated embodiment, deck 1126 includes two parallel legs 1162 extending in blank transfer direction X and defining a transfer surface 1164 thereon. Blank transfer station 1106 may include a conveyor belt, chains, lugs, or any other suitable mechanism, coupled to legs 1162, as part of deck 1126 to advance blank 100 on transfer surface 1164 along deck 1126. Additionally or alternatively, blank transfer station 1106 may include a pusher mechanism (not shown) that engages trailing edge 104 (see FIG. 1) of blank 100 to push blank 100 in blank transfer direction X.

Blank 100 is advanced through blank transfer station 1106, in blank transfer direction X, towards compression station 1108. As blank 100 is being advanced, blank 100 is transferred through an adhesive assembly 1170 within blank transfer station 1106. Adhesive assembly 1170 includes a plurality of adhesive applicators 1172 configured to apply adhesive to specific locations of blank 100, specifically interior surface 101 of blank 100, as described elsewhere herein. In the example embodiment, the adhesive is a hot-melt adhesive, although other adhesive types are contemplated within the scope of the present disclosure. Adhesive assembly 1170 also include one or more sensors (e.g., optical sensors, not shown) to detect the position of blank 100 within or relative to adhesive assembly 1170. Adhesive applicators 1172 are activated (e.g., by control system 1112) based on the signals from the sensors and/or a servomotor encoder position to ensure accurate and precise placement of the adhesive on blank 100.

Though a variety of adhesives may be used, the adhesive may be a hot-melt adhesive, and may preferably have a viscosity that is greater than or equal to 2000 cps, a non-limiting commercially available example of which is "Technomelt Supra 100 Plus-22" manufactured by Henkel Corporation. The control system 1112 may use scheduled high-speed outputs driven from the motion cycle within the processor and high-speed glue solenoids to achieve a level of accuracy required to place adhesive onto the blank 100 at predetermined flange targets.

Figure 17:
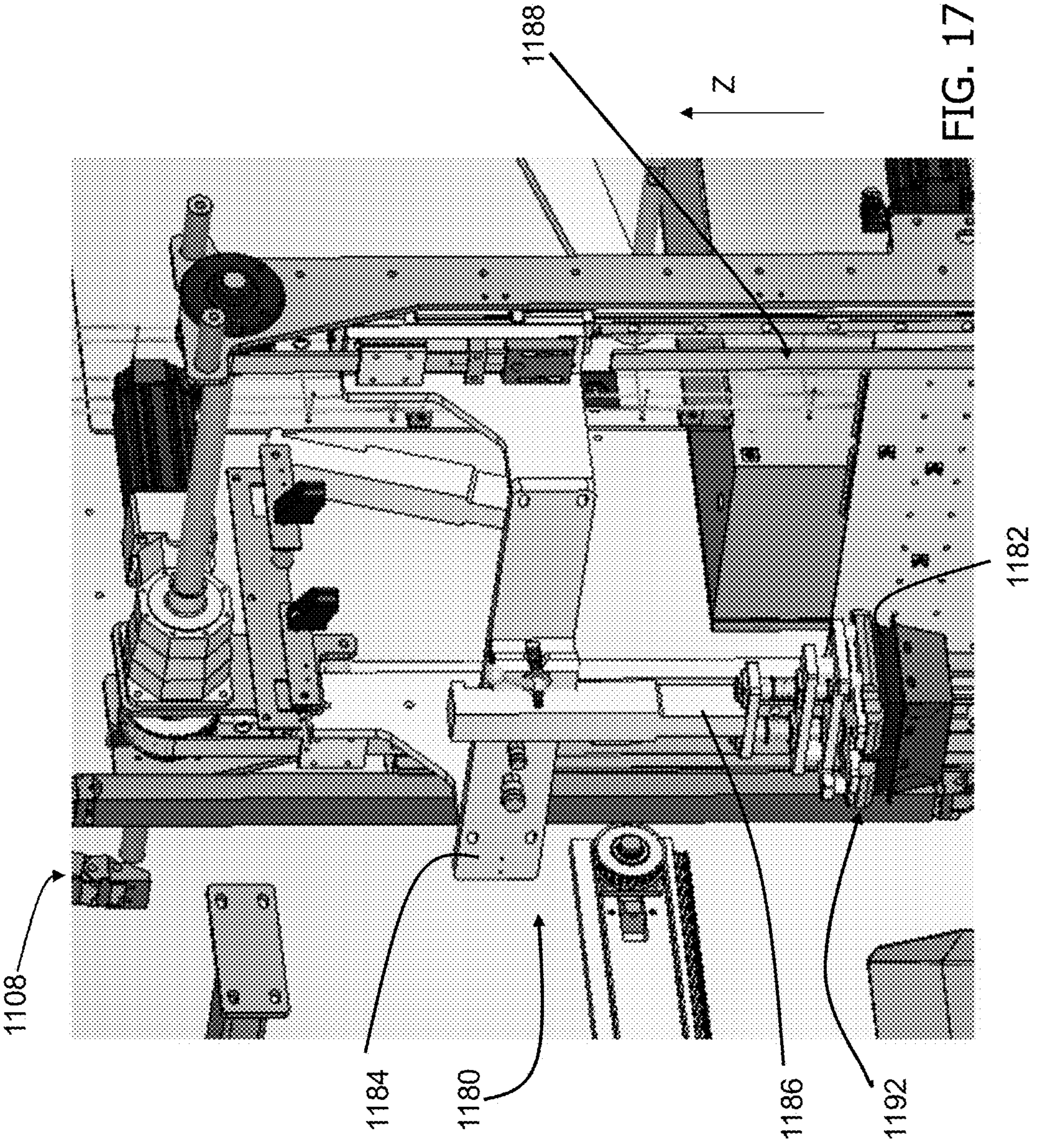
FIGS. 17, 18A, and 18B depict a compression station of the container forming apparatus shown in FIG. 10.

Once adhesive is applied to blank 100, blank 100 is advanced from blank transfer station 1106 to compression station 1108. The timing of the application of adhesive onto the blank and movement to compression station 1108 is set to ensure the adhesive is molten until compression is applied and the compression timing is set to allow the curing to take place quickly. With reference now to FIG. 17, compression station 1108 includes a plunger mechanism 1180 configured to drive a mandrel 1182 upwards and downwards along vertical direction Z. In the example embodiment, plunger mechanism 1180 includes a subframe 1184 and a post 1186. Subframe 1184 is raised and lowered along two vertical tracks 1188, and post 1186 is coupled to subframe 1184 and maintains the position of mandrel 1182 relative thereto. Mandrel 1182 includes an outer profile having a shape complementary to an inner profile of a shape of the container to be formed. Mandrel 1182 is exchangeable, based upon the particular container to be formed thereby. Mandrel 1182 includes a plurality of side plates 1190 (see FIG. 18A) and a bottom plate (not shown), collectively defining an outer surface of mandrel 1182. Although not shown, the bottom plate has holes therein; suction is applied to blank 100 through these holes, to maintain the position of blank 100 relative to mandrel 1182 during formation of container 200. Alternatively, mandrel 1182 includes no bottom plate, and has one or more vacuum suction cups (not shown) at the bottom thereof, oriented downwardly to receive and retain blank 100 relative to mandrel 1182. In some embodiments, one or more of the side plates 1190 may include holes, to apply suction to the walls of the formed container, as described further herein.

A plurality of compression plates 1192 are coupled to post 1186 and are operable independently from the vertical movement of plunger mechanism 1180 to raise and lower mandrel 1182, as described further herein. In particular, compression station 1108 includes side compression plates 1194 and end compressions plates 1196 (see FIG. 18A). Each compression plate 1192 defines a respective compression surface on a bottom or lower surface thereon. Each compression plate 1192 is raised and lowered by a respective actuator (e.g., pneumatic, spring-based, etc.). Operation of side compression plates 1194 is independent from operation of end compression plates 1196.

Figure 18A:
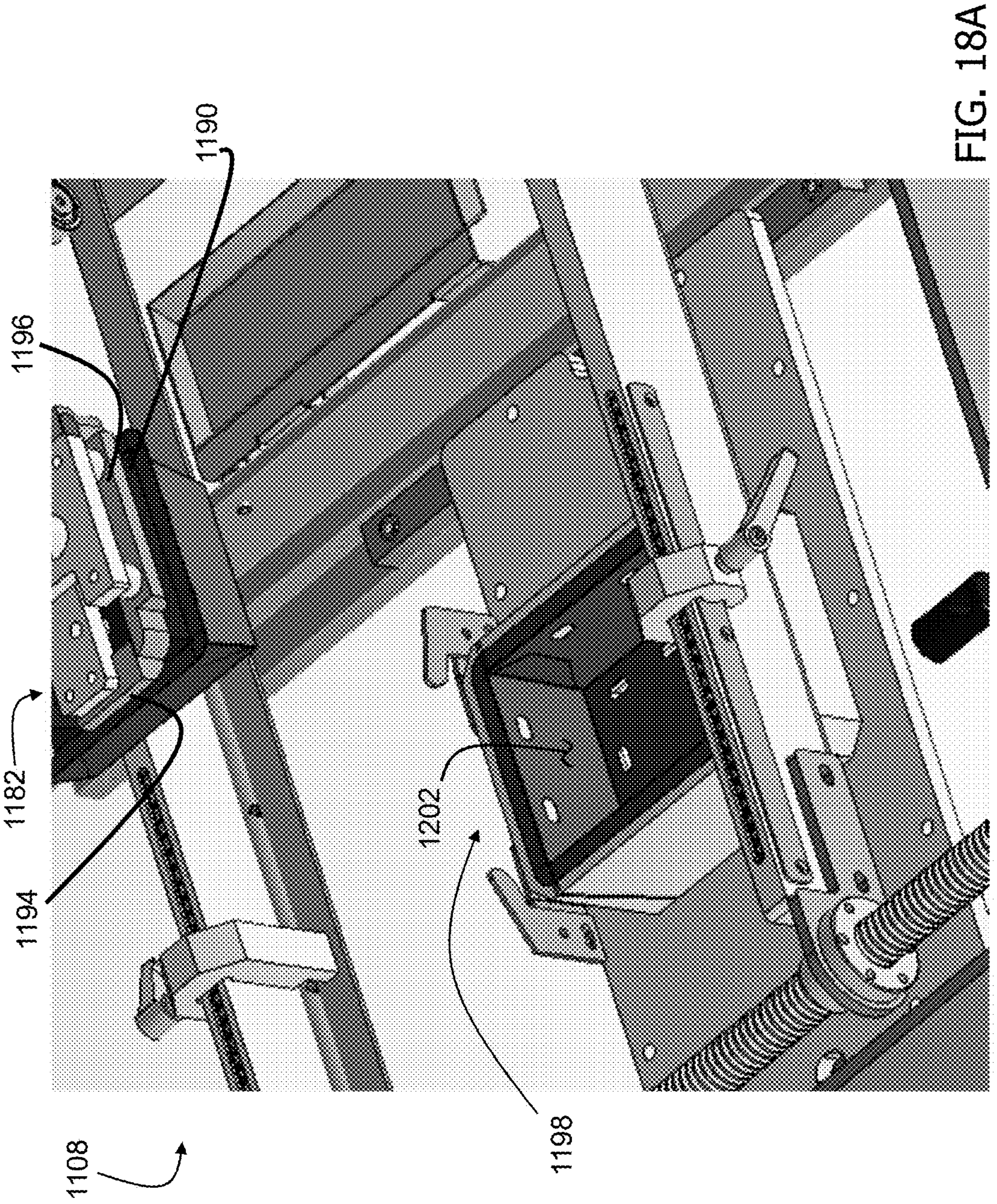

As shown in FIG. 18A, compression station 1108 further includes a forming tool 1198 positioned vertically below mandrel 1182. Forming tool 1198 includes a plurality of side walls and a bottom wall, defining a cavity 1202 therebetween. Forming tool 1198 includes an inner profile having a shape complementary to an outer profile of the shape of the container to be formed; therefore, the inner profile of forming tool 1198 is also complementary to the outer profile of mandrel 1182. Forming tool 1198 is also exchangeable, based upon the particular container to be formed in apparatus 1100.

In operation, container 200 is formed from blank 100 by driving mandrel 1182, with blank 100 coupled thereto, downwards into forming tool 1198. More particularly, blank 100 is advanced into compression station 1108 into a position beneath mandrel 1182. Even more particularly, blank 100 is positioned such that bottom panel 108 of blank 100 is below a bottom surface of mandrel 1182 (e.g., a bottom plate of mandrel 1182, or bottom edges of the side plates 1190 forming mandrel 1182). The suction function of mandrel 1182 is activated, to keep blank 100 appropriately positioned with respect to mandrel 1182. Then mandrel 1182 is driven downwards by actuating plunger mechanism 1180, which forces blank 100 into cavity 1202 of forming tool 1198.

Forming tool 1198 is specifically shaped to cause folding of the side panels 116, 122 and end panels 106, 110 of blank 100, such that the outer perimeter of container 200 is formed. For example, end walls of forming tool 1198 may extend slightly higher than side walls of forming tool 1198, to ensure end panels 106, 110 are folded inwardly before side panels 116, 122. The complementary shapes of forming tool 1198 and mandrel 1182 facilitate predictable and accurate folding of the side panels 116, 122, glue panels 130, and end panels 106, 110, around mandrel 1182 in their respective fully folded configurations. Moreover, as blank 100 is driven into forming tool 1198 and folded against mandrel 1182, the complementary relationship of forming tool 1198 and mandrel 1182 causes compression of the glue panels 130 against the interior surface 101 of the side panels 116, 122, securing these panels in an overlying face-to-face relationship.

Once mandrel 1182 is fully lowered, side compression plates 1194 are lowered to rotate side flange panels 150, 152 outwardly, and fold side flange panels 150, 152 against a top edge of forming tool 1198. Side flange panels 150, 152 are thereby folded into their fully folded configuration, parallel to bottom panel 108 of blank 100. Thereafter, end compression plates 1196 are lowered to rotate end flange panels 134, 138 outwardly, and fold end flange panels 134, 138 against the top edge of forming tool 1198. This rotation causes end flange tabs 142, 144 to fold atop side flange tabs 158, 160, into an overlying face-to-face relationship therewith. Moreover, end compression plates 1196 exert sufficient force to compress end flange tabs 142, 144 against side flange tabs 158, 160, ensuring that the flange tabs are adhered to one another. Thereby, the top flange 214 of container 200 is fully formed and secured.

Figure 18B:
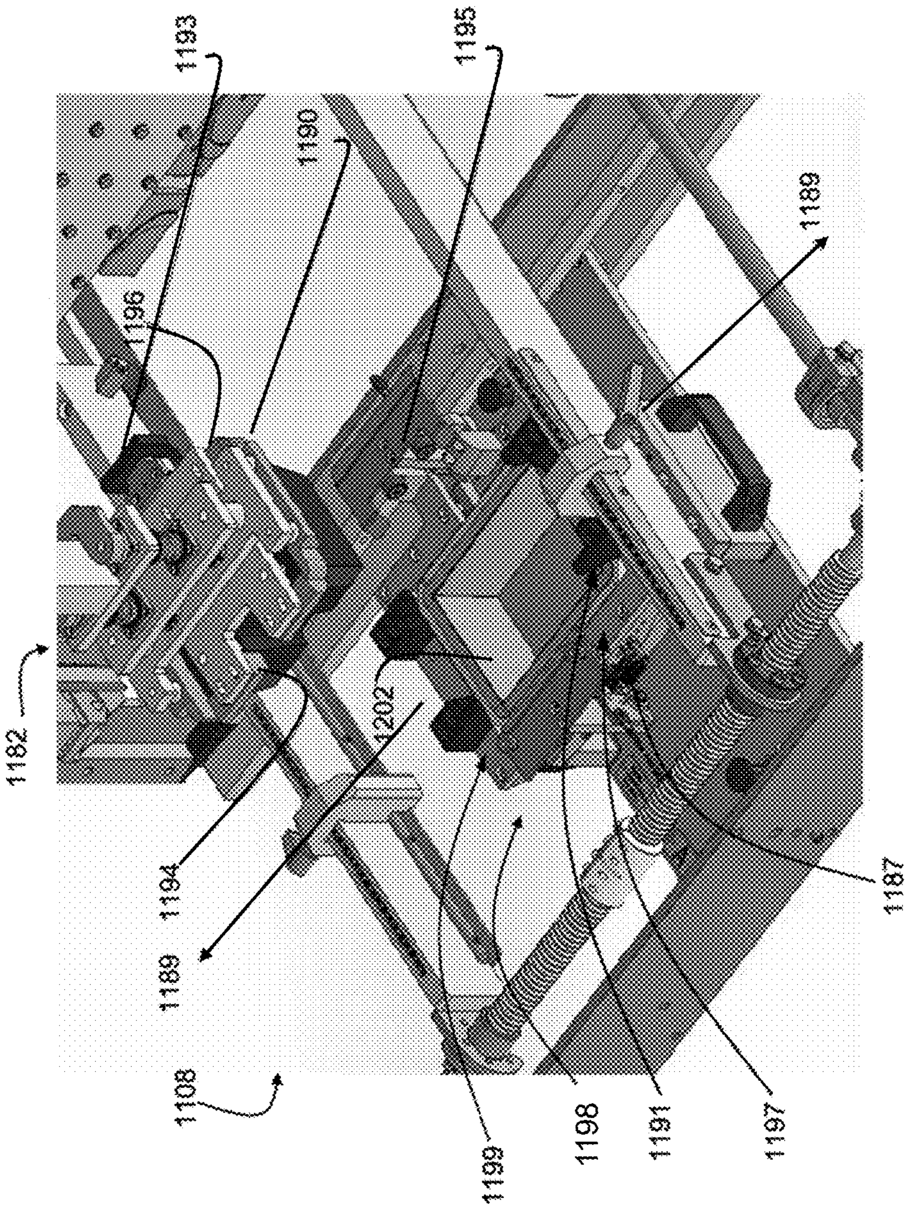

Referring to FIG. 18B, in some example implementations, mandrel 1182 is lowered to engage tray 200 and held in position by vacuum cups located in the bottom of mandrel 1182. The tray flaps (or glue panels) 130 may be first engaged by forming ears 1191 to force them into the internal cavity of the tray 200. As the mandrel 1182 descends into cavity 1202 the walls 106, 110, 116, 122 are folded upwards. As the forming ears 1191 are inside the perimeter of the tray 200 flange, a cam 1193 mounted on mandrel 1182 engages with cam follower bearings 1195 which uses liner bearings to force tab folding ears mounting plates 1197 and 1199 to open out on plane 1189 past the perimeter of the tray 200. When tray 200 is disposed between the mandrel 1182 and female cavity 1202, the tabs 130 are under compression to side walls 116, 122 and adhere thereto. Side flanges 150, 156 are folded into position for folding anvils 1194 which are mounted to the mandrel 1182. The end flanges 134, 138 will at this point still be vertical. When mandrel 1182 reaches the bottom of cavity 1202 folding anvils 1196 move down as the axis continues to drop since folding anvils 1196 are connected to a separate floating shaft that is spring loaded, thereby folding the end flanges 134, 138 on top of the side flanges 150, 156 into their formed position. The axis then moves down a small amount to engage with the main compliance spring to apply pressure to the flange and cure the adhesive.

Figure 27:
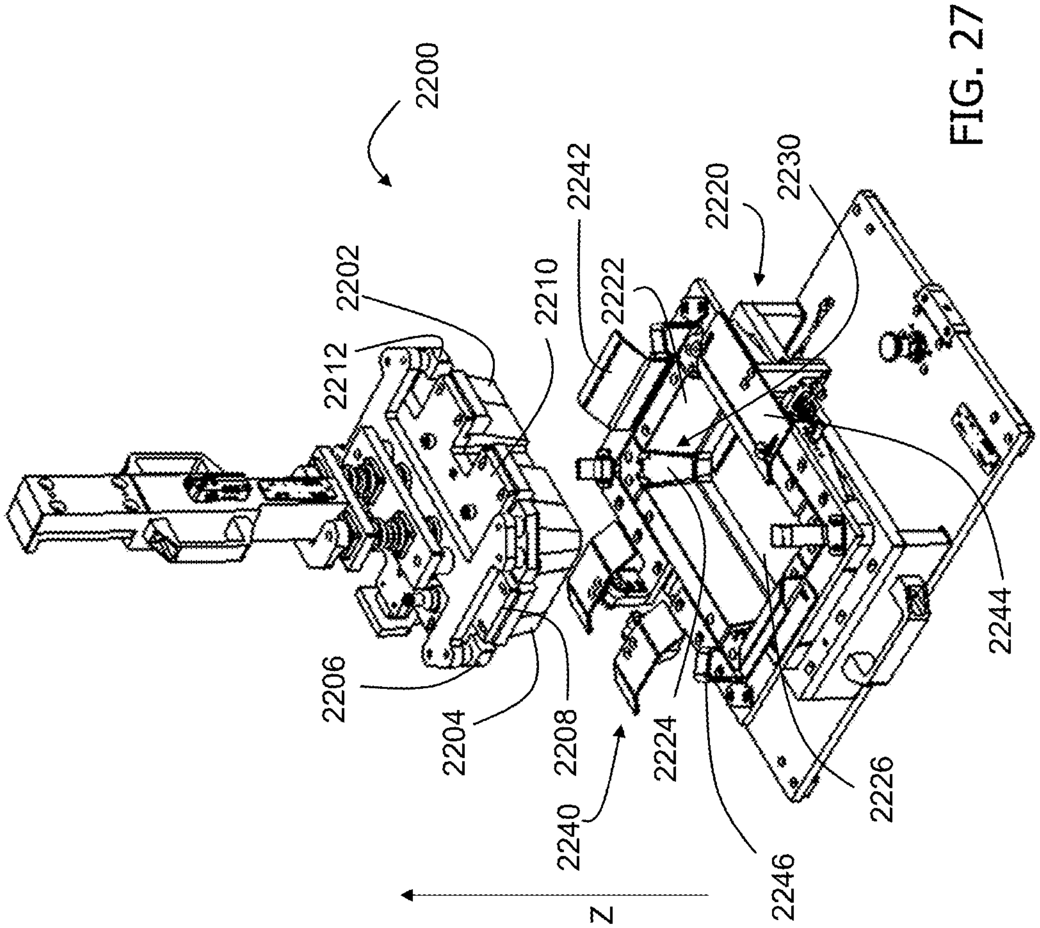
FIG. 27 is a perspective view of an alternative embodiment of a compression station of the container forming apparatus shown in FIG. 10.

FIG. 27 depicts an alternative embodiment of the compression station of apparatus 1100, referred to using reference numeral 2200. In particular, compression station 2200 is suitable for forming eight-sided containers, such as containers 900, 1800, and/or 2100, from their respective blanks. Where the elements of compression station 1108 and compression station 2200 are similar, the same reference numerals may be used, and the related functionality may be similar to that described above with respect to compression station 1108.

Compression station 2200 includes plunger mechanism 1180 (shown and described with respect to FIG. 17) configured to drive a mandrel 2202 upwards and downwards along vertical direction Z. Mandrel 2202 includes an outer profile having a shape complementary to an inner profile of a shape of the container to be formed (e.g., an eight-sided container). Mandrel 2202 is exchangeable, based upon the particular container to be formed thereby. Mandrel 2202 includes a plurality of side plates 2202 and a bottom plate (not shown), collectively defining an outer surface of mandrel 2202. Although not shown, the bottom plate has holes therein; suction is applied to the blank through these holes, to maintain the position of the blank relative to mandrel 2202 during formation of the corresponding container. Alternatively, mandrel 2202 includes no bottom plate, and has one or more vacuum suction cups (not shown) at the bottom thereof, oriented downwardly to receive and retain the blank relative to mandrel 2202. In some embodiments, one or more of the side plates 2204 may include holes, to apply suction to the walls of the formed container, as described herein.

A plurality of compression plates 2206 are operable independently from the vertical movement of plunger mechanism 1180 to raise and lower mandrel 2202, as described further herein. In particular, compression station 2200 includes side compression plates 2208, end compression plates 2210, and corner compression plates 2212. Each of these compression plates defines a respective compression surface on a bottom or lower surface thereon. Compression plates 2206 may be raised and lowered collectively or individually by a respective actuator (e.g., pneumatic, spring-based, etc.). In one embodiment, operation of side compression plates 2208, end compression plates 2210, and corner compression plates 2212 are each independent.

Compression station 2200 further includes a forming tool 2220 positioned vertically below mandrel 2202. Forming tool 2220, as shown in both FIGS. 27 and 28, includes a plurality of side walls 2222, a plurality of corner walls 2224, and a bottom wall 2226. Side walls 2222, corner walls 2224, and bottom wall 2226 define a cavity 2228 (shown in FIG. 28) therebetween. Forming tool 2220 includes an inner profile having a shape complementary to an outer profile of the shape of the container to be formed; therefore, the inner profile of forming tool 2220 is also complementary to the outer profile of mandrel 2202. Forming tool 2220 is also exchangeable, based upon the particular container to be formed in apparatus 1100.

Figure 24:
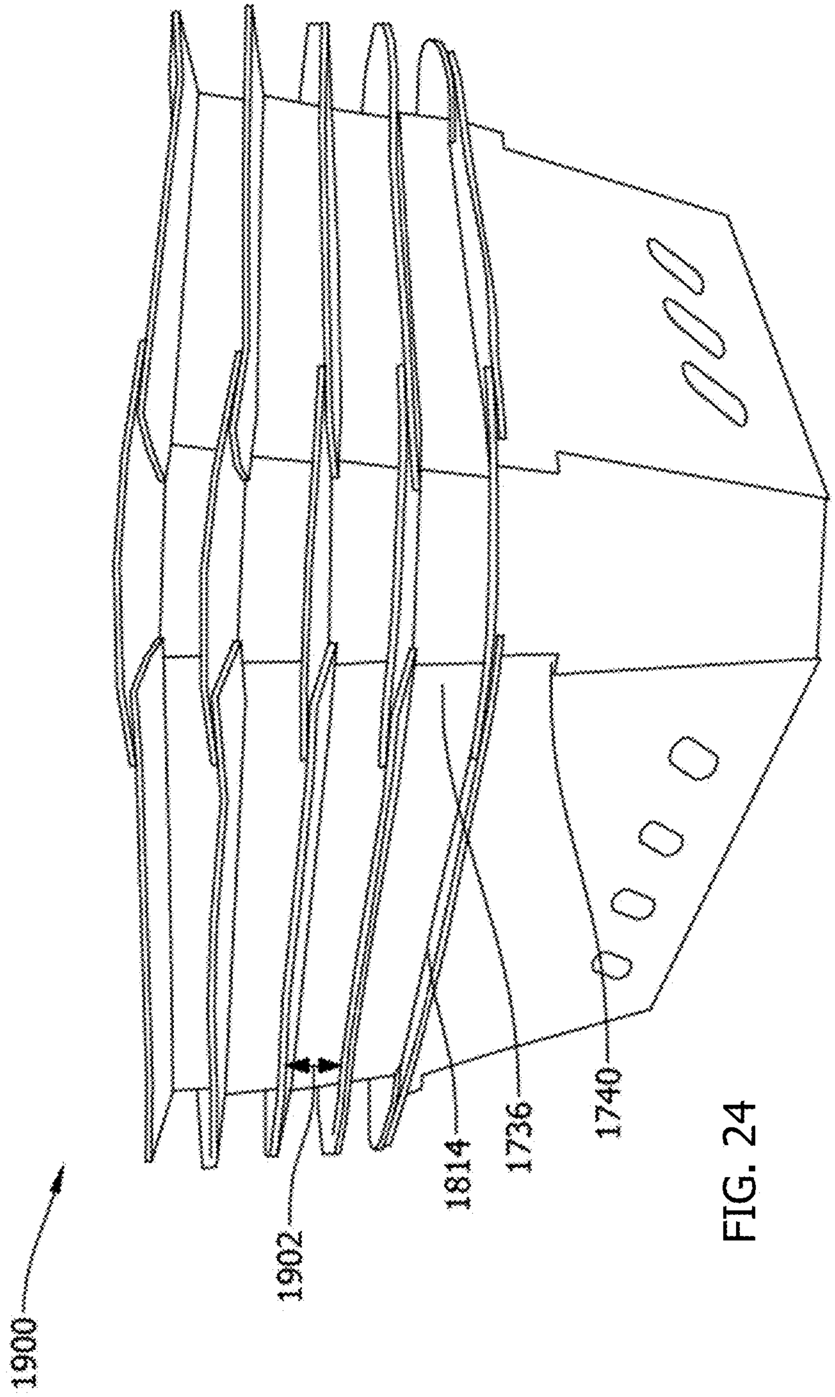
FIG. 24 is a side perspective view of a stack of a plurality of containers shown in FIG. 23.
Figure 28:
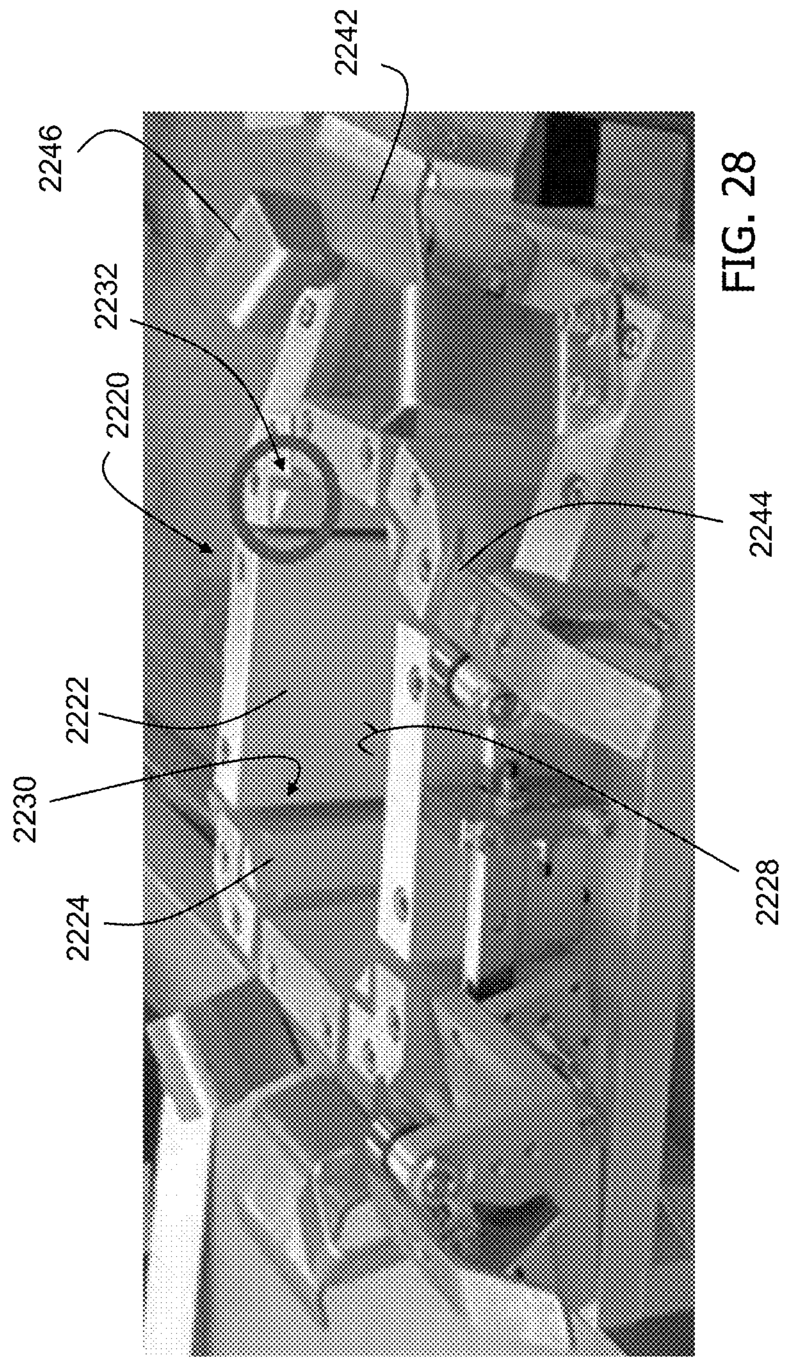
FIG. 28 is an expanded view of the compression station shown in FIG. 27.

In the example embodiment, forming tool 2220 further includes gaps 2230 defined between adjacent side walls 2222 and corner walls 2224. Additionally, corner walls 2224 includes channels 2232 defined in the top surface thereof, as shown in FIG. 28. As described further herein, these channels 2232 accommodate de-nesting tabs (e.g., de-nesting tabs 1736, shown in FIGS. 22-24, or de-nesting tabs 2036, shown in FIGS. 25 and 26) when the container is formed from the corresponding blank. Channels 2232 have a depth (e.g., measured vertically downward from the top surface of corner walls 2224) that is greater than or equal to a height of the de-nesting tabs.

Forming tool 2220 further includes a plurality of forming plates 2240, including side forming plates 2242, end forming plates 2244, and corner forming plates 2246.

In operation of compression station 2200, with reference to blank 2000 and container 2100 for the sake of example, container 2100 is formed from blank 2000 by driving mandrel 2202, with blank 2000 coupled thereto, downwards into forming tool 2220. More particularly, blank 2000 is advanced into compression station 2200 into a position beneath mandrel 2202. Even more particularly, blank 2000 is positioned such that bottom panel 2010 of blank 2000 is below a bottom surface of mandrel 2202 (e.g., a bottom plate of mandrel 2202, or bottom edges of the side plates 2204 forming mandrel 2202). The suction function of mandrel 2202 is activated, to keep blank 2000 appropriately positioned with respect to mandrel 2202. Then mandrel 2202 is driven downwards by actuating plunger mechanism 1180, which forces blank 2000 into cavity 2228 of forming tool 2220.

As blank 2000 is lowered towards forming tool 2220, forming plates 2240 (e.g., the sloped surfaces thereof) engage the panels of blank 2000 in a predetermined order and rotate the panels inwardly toward mandrel 2202. Forming tool 2220 is specifically shaped to cause folding of the side panels 2002, 2004, end panels 2006, 2008, and corner panels 2020 of blank 2000, such that the outer perimeter of container 2100 is formed. Additionally, channels 2232 accommodate the de-nesting tabs that extend substantially vertically downward once the side, end, and corner panels have been folded upward. The complementary shapes of forming tool 2220 and mandrel 2202 facilitate predictable and accurate folding of the side panels 2006, 2008, corner panels 2020, glue panels 2024, and end panels 2002, 2004, around mandrel 2202 in their respective fully folded configurations. Moreover, as blank 2000 is driven into forming tool 2220 and folded against mandrel 2202, the complementary relationship of forming tool 2220 and mandrel 2202 causes compression of the glue panels 2024 against the interior surface of the side panels and end panels of blank 2000, securing these panels in an overlying face-to-face relationship.

Once mandrel 2202 is fully lowered, side compression plates 2208 are lowered to rotate side flange panels 2016, 2018 outwardly, and fold side flange panels 2016, 2018 against atop edge of forming tool 2202. End compression plates 2210 are lowered to rotate end flange panels 2012, 2014 outwardly, and fold end flange panels 2012, 2014 against the top edge of forming tool 2202. Thereafter, corner compression plates 2212 are lowered to rotate corner flange panels 2028 outwardly, and fold corner flange panels 2028 against the top edge of forming tool 2202. This rotation causes corner flange panels 2028 to fold atop end and side flange panels 2012, 2014, 2016, 2018, into an overlying face-to-face relationship therewith. Moreover, corner compression plates 2212 exert sufficient force to compress corner flange panels 2028 against end and side flange panels 2012, 2014, 2016, 2018, ensuring that these panels are adhered to one another. Thereby, the top flange 2114 of container 2100 is fully formed and secured.

As described elsewhere herein, the container formed using apparatus 1100 includes a planar top flange, with the flange tabs secured using hot-melt adhesive. These containers exhibit improved stacking and unstacking (or de-nesting) characteristics, are stronger than conventional trays without an adhered or secured flange, and further exhibit improved functionality when sealed with a top film Once the container is formed, mandrel 1182 is raised by actuating plunger mechanism 1180. The suction function of mandrel 1182 remains active, and container 200 is raised along with mandrel 1182, and remains coupled thereto. A tray collection assembly 1210 is actuated to retrieve the formed container 200 from mandrel 1182. The tab folding mechanisms 1197, 1199 will return to home position as the cam 1193 exits the cam follower bearings 1195 and are pulled into position by spring 1187.

Figure 19:
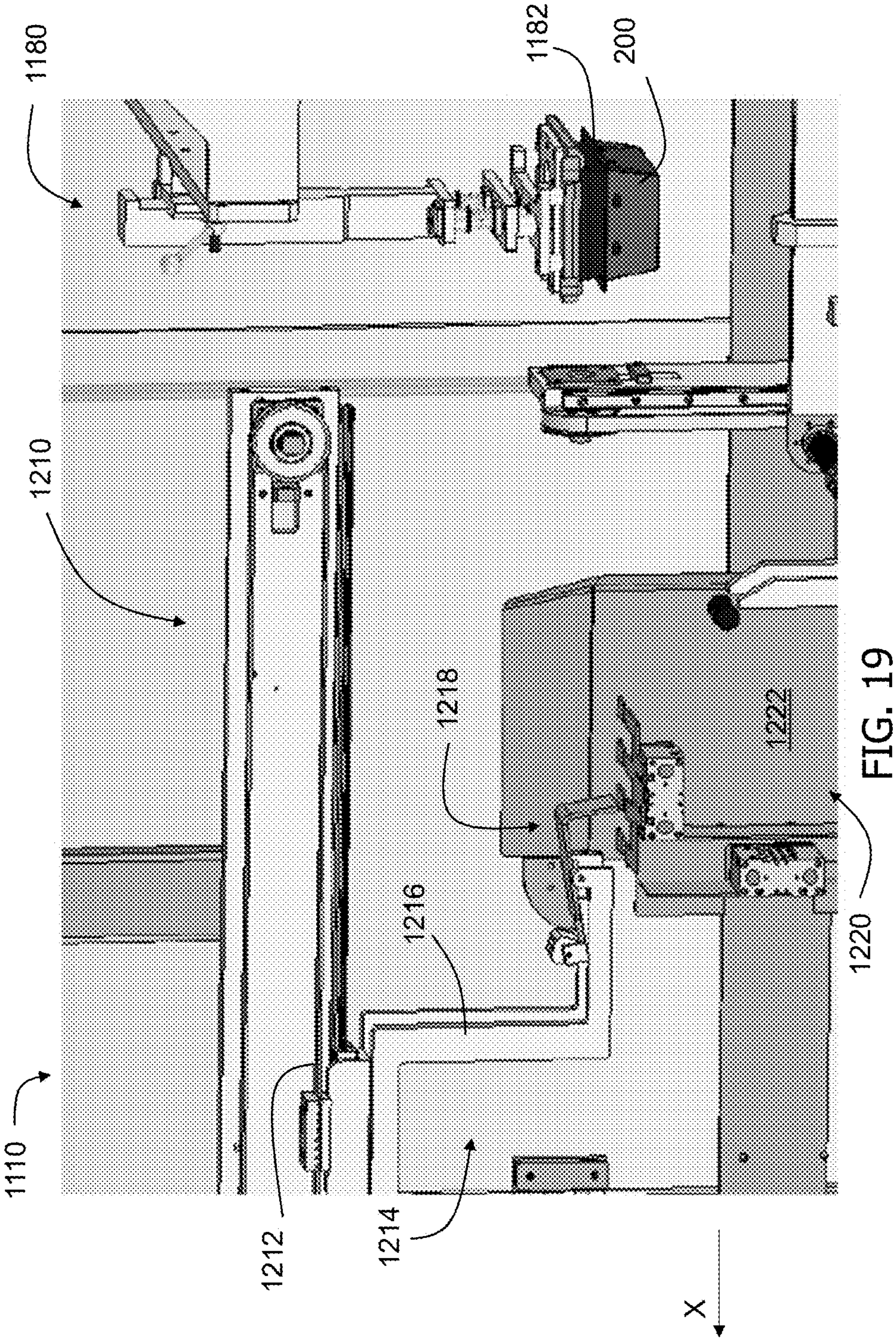
FIGS. 19 and 20 depict a stacking station of the container forming apparatus shown in FIG. 10.

More specifically, with reference to FIGS. 19 and 20, stacking station 1110 includes tray collection assembly 1210, which itself includes a horizontal linear track 1212 (e.g., a belt drive) extending along blank transfer direction X. A clamping tool 1214 is driven along track 1212, parallel to blank transfer direction X. Clamping tool 1214 includes a subframe 1216 and an articulating clamp mechanism 1218 coupled to an upstream end of subframe 1216. In operation, clamping tool 1214 is driven towards compression station 1108 until articulating clamp mechanism 1218 engages with container 200, while mandrel 1182 is being lifted from its lowered position within forming tool 1198 (not specifically shown) to its raised position (shown in FIG. 17). Clamping tool 1214, plunging mechanism 1180, and mandrel 1182 are operated in conjunction with one another, such that articulating clamp mechanism 1218 clamps the formed container 200 while mandrel 1182 is being raised by plunging mechanism 1180, and simultaneously, the suction function of mandrel 1182 is de-activated. Accordingly, container 200 is released from mandrel 1182 as mandrel 1182 rises, and clamping tool 1214 is driven back in blank transfer direction X to withdraw container 200 from the vertical path of mandrel 1182, out of compression station 1108 and into stacking station 1110.

The clamping tool 1214 may take the form of a fixed metallic finger that has a corresponding cut out in mandrel 1182 to allow the finger to be positioned inside the perimeter of mandrel 1182 and thus be on the inside of tray 200 when the mandrel 1182 is lifted vertically upwards (in the z-direction). Based on the position of mandrel 1182 (which may be determined from the servomotor encoder position), a pneumatic cylinder with clamping face may operate to hold the tray 200 in position until the mandrel 1182 is withdrawn from the tray 200 cavity, at which point the clamping tool can be driven horizontally (in the x-direction) to the stacking position where the tray 200 is released.

Figure 3:
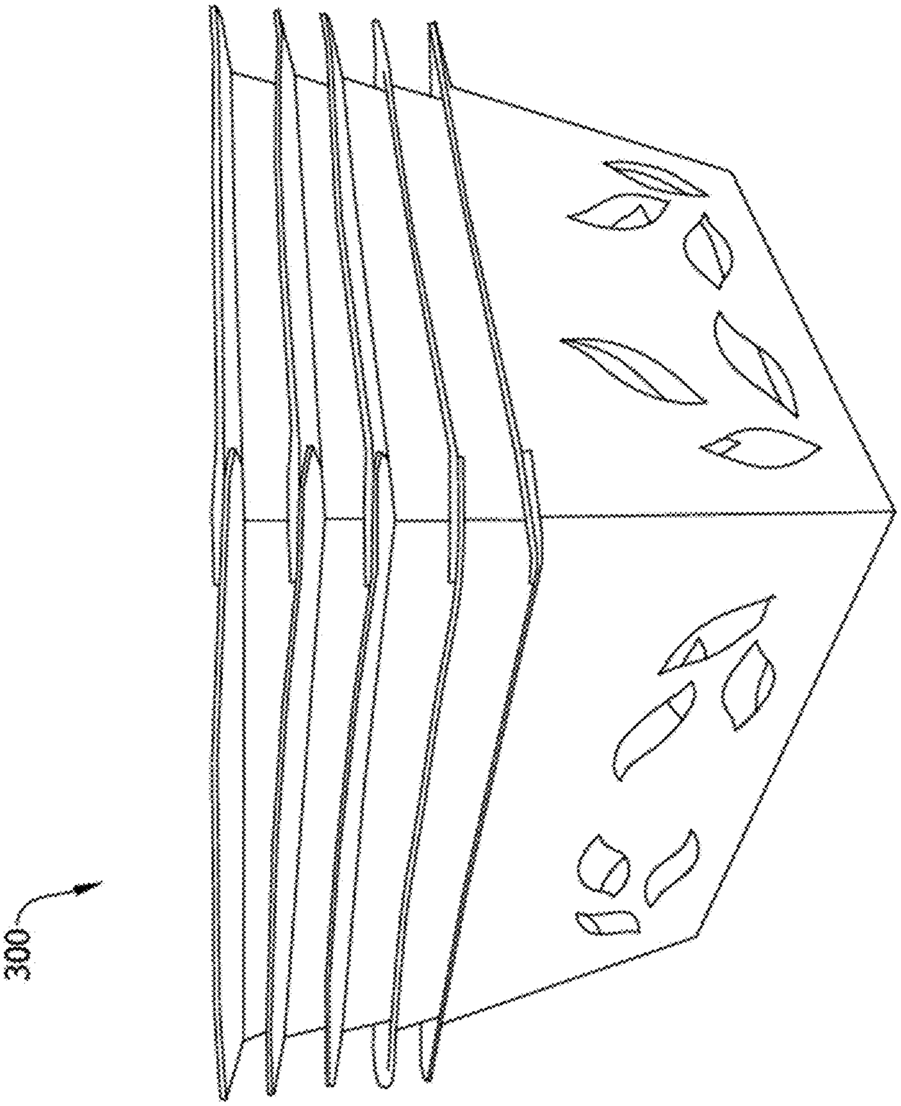
FIG. 3 is a side perspective view of a stack of a plurality of containers shown in FIG. 2.

A trough or channel 1220 is arranged in stacking station 1110. Channel 1220 is formed by a plurality of vertically extending plates 1222 and is configured to receive a plurality of containers 200 therein. In particular, channel 1220 receives containers 200 and arranges them in a stack 300 (as shown in FIG. 3) therein.

In operation, clamping tool 1214 is driven in blank transfer direction X until container 200 is located above channel 1220. Articulated clamping mechanism 1218 is actuated to release container 200 into channel 1220. In some embodiments, container 200 is actively transferred into channel 1220, for instance, by a controlled blast of air (not shown). This arrangement may facilitate improved stacking of containers within channel 1220. In other embodiments, container 200 is passively transferred, or dropped, into channel 1220.

Stacking station 1110 further includes one or more sensors (e.g., weight sensors, optical sensors, etc., not shown) that detect when a complete stack of containers is formed. For example, the sensors may sense a weight of the stack, a height of the stack, or a number of containers in the stack. The stack is considered "complete" according to parameters input to and/or stored in control system 1112, and may be readily adjusted by an operator. Once the complete stack is detected, side plates 1224 of channel 1220 are opened, and a discharge plate (not shown) is actuated to advance the stack out of channel 1220 and to a subsequent station.

In the example embodiment, apparatus 1100 is designed for high throughput, and is configured to form up to 30 containers per minute according to the above-described operation. It is appreciated that apparatus 1100 is highly customizable. For instance, blank feeding station 1104 includes adjustment mechanisms (not shown) to accommodate blanks of different length and width. The adjustment mechanisms may be manually operated. Additionally or alternatively, adjustment mechanisms may be operated via a user interface of control system 1112. For instance, an operator may use the user interface to input the length and width of the blanks, and control system 1112 may automatically control the adjustment mechanisms accordingly. In some cases, one or more of the adjustment mechanisms, whether manually or computer controlled, may cause adjustment of one or more components of apparatus 1100. For example, one adjustment mechanism, which is manipulated to accommodate a blank's width, may control components throughout apparatus 1100 (e.g., in blank feeder station 1104, transfer station 1106, compression station 1108, and/or stacking station 1110).

Additionally, with respect to blank feeder station 1104, control system 1112 may be used to adjust the position of vacuum suction cups 1160 and/or the vacuum pressure generated in vacuum assembly 1152, to accommodate different sizes and weights of blanks. With respect to blank transfer station 1106, control system 1112 may be used to adjust the position and activation control of adhesive applicators 1172 to accommodate different sizes, shapes, and configurations of blanks. The amount and temperature of the applied adhesive may also be precisely controlled.

With respect to compression station 1108, mandrel 1182 and forming tool 1198 are exchangeable to accommodate various sizes and configurations (e.g., four-sided, eight-sided, etc.) of blanks/containers. Moreover, control system 1112 may be used to adjust the vacuum pressure generated in mandrel 1182 to accommodate various blanks. In stacking station 1110, the position of various components (e.g., articulated clamping mechanism 1218, plates 1222 of channel 1220) can be adjusted, manually or via control system 1112, to accommodate containers of varying sizes and shapes. Additionally or alternatively, apparatus 1100 may include no stacking station (e.g., formed containers may be discharged from apparatus 1100 to be stacked elsewhere, or to be filled with product without being stacked), or apparatus 1100 may include additional stations, such as a product filling station, a container sealing station, a container packing station, etc.

Additionally, the operation of components of apparatus 1100, such as the timing, speed, and position thereof, is virtually infinitely customizable, via control system 1112. That is, any component may be independently operable via a respective servomotor (or other servomechanism), which is controlled by control system 1112 under instructions provided thereto by an operator through a user interface.

In one example embodiment, apparatus 1100 includes a blank transfer station including an adhesive assembly having a plurality of adhesive applicators. The blank is transferred in a blank transfer direction through the adhesive assembly, where at least one of the adhesive applicators applies hot-melt adhesive to an interior surface of the side flange tabs. Apparatus 1100 also includes a compression station downstream of the blank transfer station, the compression station including a vertically movable mandrel and a forming tool below the mandrel. The forming tool defines a cavity therein and has an inner profile complementary in shape to an outer profile of the mandrel. The blank is positioned beneath the mandrel, and the mandrel drives the blank downward into the cavity of forming tool, which rotates the end panels inwardly into engagement with the mandrel and rotates the side panels inwardly into engagement with the mandrel and the end panels. The compression station also includes end compression plates and side compression plates coupled to the mandrel. The side compression plates rotate the side flange panels outwardly into engagement with a top edge of the forming tool, and, subsequently, the end compression plates rotate the end flange panels outwardly into engagement with the top edge of the forming tool, the end compression panels further compressing the end flange tabs against the side flange tabs to form the container having a fully formed top flange.

In addition or alternatively, apparatus 1100 may include any of the following features or components, in any combination:

(A) when the blank further includes a respective interior side panel extending from each side edge of each end panel, as the blank is transferred through the adhesive assembly, at least one of the plurality of adhesive applicators is further configured to apply the holt-melt adhesive to a portion of an interior surface of the side panels, and wherein, as the mandrel drives the blank into the cavity of the forming tool, the forming tool rotates the interior side panels inwardly into engagement with the mandrel prior to rotating the side panels into engagement with the mandrel, and the forming tool compresses the side panels against the interior side panels in an overlying face-to-face relationship;

(B) the compression station further includes a plurality of forming ears positioned around a perimeter of the folding tool, each forming ear extending partially inwardly into the cavity to engage the interior side panels as the blank is lowered towards the folding tool;

(C) the compression station further includes a cam mounted on the mandrel, and the cam engages with cam follower bearings to rotate the forming ears away from the cavity as the mandrel lowers the blank further the folding tool;

(D) the blank transfer station is configured to advance the blank, including the hot-melt adhesive applied thereto, from the adhesive assembly to the compression station while the holt-melt adhesive remains molten;

(E) the timing of the compression station is controlled using a control system, such that the hot-melt adhesive cures during compression of the blank to form the container;

(F) the adhesive applicators are configured to apply the hot-melt adhesive having a viscosity of at least 2000 centipoise (cps);

(G) the mandrel includes a vacuum assembly configured to retain the blank against the mandrel;

(H) further including a clamping tool configured to transfer the formed container from the compression station to a stacking station; and (I) movement of the side compression plates and the end compression plates is controlled independently of movement of the mandrel using a control system.

Figure 21:
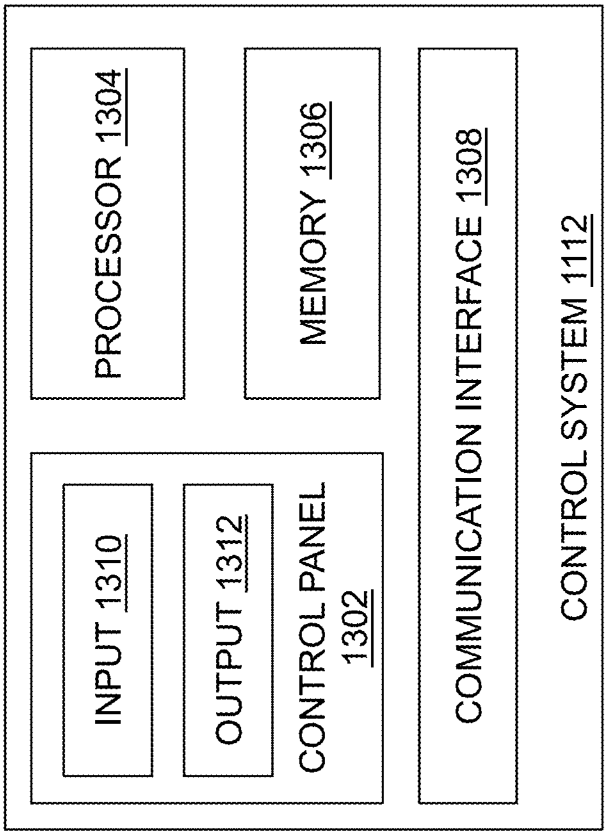
FIG. 21 is a schematic block diagram of a control system of the container forming apparatus shown in FIG. 10.

FIG. 21 depicts a schematic block diagram of control system 1112. In the example embodiment, control system 1112 includes a control panel 1302, a processor 1304, a memory 1306, and a communication interface 1308. In certain embodiments, reprogrammed recipes or protocols embodied on a non-transitory computer-readable storage medium (e.g., stored in memory 1306) are programmed in and/or uploaded into processor 1304 and such recipes include, but are not limited to, predetermined speed and timing profiles, wherein each profile is associated with forming containers from blanks having a predetermined size and shape.

In certain embodiments, control system 1112 is configured to facilitate selecting a speed and/or timing of the movement and/or activation of any disclosed components of apparatus 1100. The components may be controlled either independently or as part of one or more linked mechanisms.

Control panel 1302 includes one or more input devices 1310 or components (e.g., a touchscreen, keyboard, mouse, microphone, and/or other input controls), and one or more output devices 1312 or components (e.g., touchscreen, non-touch screen (e.g., LCD monitor), speakers, lights, and/or other output devices). In certain embodiments, control panel 1302 allows an operator to select a recipe that is appropriate for a particular blank and/or container. Each recipe is a set of computer instructions that instruct apparatus 1100 as to forming the container. In embodiments where one or more actuators within apparatus 1100 is a servomechanism, control system 1112 is able to control the movement of each such actuator independently relative to any other component of apparatus 1100. This enables an operator to maximize the number of containers that can be formed by apparatus 1100, easily change the size of blanks and/or containers being formed on apparatus 1100, and automatically change the type of blanks and/or containers being formed on apparatus 1100 while reducing or eliminating manual adjustments of apparatus 1100.

In the example embodiment, control system 1112 is shown as being centralized within apparatus 1100, however control system 1112 may be a distributed system throughout apparatus 1100, within a building housing apparatus 1100, and/or at a remote control center. Control system 1112 includes processor 1304 configured to control apparatus 1100 to perform the methods and/or steps described herein (e.g., the steps of method 1000, shown in FIG. 9). As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels.

In the embodiments described herein, memory 1306 may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used.

Communication interface 1308 is used to transmit instructions from control system 1112 to various components (e.g., actuators) of apparatus 1100 and to receive information from various components (e.g., actuators, sensors, etc.) of apparatus 1100 and/or from remote devices. Communication interface 1308 may be any suitable wired or wireless communication interface, to facilitate any suitable communication format within control system 1112 and apparatus 1100 (e.g., Wi-Fi, BLUETOOTH, cellular data connection, etc.).

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a PLC cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, flow control system control commands. The execution of sequences of instructions is not limited to any specific combination of hardware circuitry and software instructions.

In the example embodiment, method 1000 (shown in FIG. 9) is performed by control system 1112 sending commands and/or instructions to components of apparatus 1100. Processor 1304 is programmed with code segments configured to perform method 1000. Alternatively, method 1000 is encoded on a computer-readable medium that is stored in memory 1306 and readable by control system 1112.

The steps of a container forming method performed by apparatus 1100, under the operation of control system 1112, may include, for example: (i) transferring the blank through the adhesive assembly; (ii) applying, using the plurality of adhesive applicators, hot-melt adhesive to an interior surface of the side flange tabs; (iii) positioning the blank below the mandrel; (iv) using the mandrel, driving the blank downwards into the cavity of the forming tool, said driving causing the forming tool to: (a) rotate the end panels inwardly into engagement with the mandrel; and (b) rotate the side panels inwardly into engagement with the mandrel and into engagement with the end panels; (v) rotating, using side compression plates coupled to the mandrel, the side flange panels outwardly into a parallel orientation to the bottom panel; (vi) after said rotating the side flange panels, rotating, using end compression plates coupled to the mandrel, the end flange panels into a parallel orientation to the bottom panel; and (vii) compressing, using the end compression plates, the end flange tabs against the side flange tabs to form the container having a fully formed top flange.

In addition or alternatively, the method may include any of the follow steps, in any combination thereof:

(A) where the blank further includes a respective interior side panel extending from each side edge of each end panel, the method further including: applying, using the plurality of adhesive applicators, hot-melt adhesive to a portion of an interior surface of the side panels; rotating, using the forming tool, the interior side panels inwardly; after said rotating the interior side panels, performing said rotating the side panels inwardly; and compressing the side panels against the interior side panels between the mandrel and the forming tool;

(B) where the compression station further comprises a plurality of forming ears positioned around a perimeter of the folding tool, each forming ear extending partially inwardly into the cavity, the method further comprising: engaging, using the forming ears, the interior side panels as the blank is lowered towards the folding tool;

(C) where the compression station further comprises a cam mounted on the mandrel, the method further comprising: engaging the cam with cam follower bearings; and rotating the forming ears away from the cavity as the mandrel lowers the blank further the folding tool:

(D) advancing the blank, including the hot-melt adhesive applied thereto, from the adhesive assembly to the compression station while the holt-melt adhesive remains molten;

(E) controlling, using a control system, a timing of the compression station is controlled, such that the hot-melt adhesive cures during compression of the blank to form the container.

(F) applying the hot-melt adhesive having a viscosity of at least 2000 centipoise (cps);

(G) retaining the blank against the mandrel using a vacuum assembly;

(H) transferring the formed container from the compression station to a stacking station using a clamping tool;

(I) controlling movement of the side compression plates and the end compression plates independently of movement of the mandrel, using a control system.

Example embodiments of containers and blanks for making the same are described above in detail. The containers and blanks are not limited to the specific embodiments described herein, but rather, components of the blanks and/or the containers may be utilized independently and separately from other components described herein. Further, embodiments of an apparatus for forming containers from blanks is described above in detail. The apparatus is not limited to the specific embodiment described herein, nor is the apparatus limited to forming containers from the specific blanks described herein. Rather, the apparatus may be used to form additional or alternative containers to those described herein.

Although specific features of various embodiments of the disclosure may be shown in some drawings and not in others, this is for convenience only. In accordance with the principles of the disclosure any feature of a drawing may be referenced and/or claimed in combination with any feature of any other drawing.

This written description uses examples to disclose various embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A container forming apparatus for forming a container from a blank, the blank including a bottom panel, two opposing side panels, two opposing end panels, four corner panels, and a respective flange panel extending from a top edge of each end panel, side panel, and corner panel, the apparatus comprising: a blank transfer station including an adhesive assembly comprising a plurality of adhesive applicators, wherein the blank is transferred in a blank transfer direction through the adhesive assembly, where at least one of the adhesive applicators applies hot-melt adhesive to an exterior surface of the flange panels extending from the top edge of the corner panels; and a compression station downstream of the blank transfer station, the compression station comprising a vertically movable mandrel and a forming tool below the mandrel, wherein the forming tool defines a cavity therein and has an inner profile complementary in shape to an outer profile of the mandrel, wherein the blank is positioned beneath the mandrel, and the mandrel drives the blank downward into the cavity of forming tool, which rotates the corner panels inwardly into engagement with the mandrel and rotates the side panels and end panels inwardly into engagement with the mandrel, the compression station further comprising compression plates coupled to the mandrel, wherein the compression plates rotate the flange panels outwardly into engagement with a top edge of the forming tool, the compression panels further compressing the flange panels extending from the top edge of the corner panels against the flange panels extending from the top edge of the side and end panels to form the container having a fully formed top flange.

2. The container forming apparatus of claim 1, wherein the forming tool comprises side walls, end walls, and corner walls.

3. The container forming apparatus of claim 2, wherein the corner walls have channels defined in a top surface thereof.

4. The container forming apparatus of claim 3, wherein the side and end panels of the blank include de-nesting tabs, and wherein the channels defined in the corner walls of the forming tool are configured to accommodate the de-nesting tabs therein when the container is formed from the blank.

5. The container forming apparatus of claim 4, wherein the channels have a depth greater than or equal to a height of the de-nesting tabs.

6. The container forming apparatus of claim 1, wherein the compression station further comprises a plurality of forming plates coupled to the forming tool, the forming plates configured to rotate the side panels, end panels, and corner panels inwardly as the mandrel is lowered into the forming tool.

7. The container forming apparatus of claim 1, further comprising a clamping tool configured to transfer the formed container from the compression station to a stacking station.

8. The container forming apparatus of claim 1, wherein the blank transfer station is configured to advance the blank, including the hot-melt adhesive applied thereto, from the adhesive assembly to the compression station while the holt-melt adhesive remains molten.

9. The container forming apparatus of claim 8, wherein a timing of the compression station is controlled using a control system, such that the hot-melt adhesive cures during compression of the blank to form the container.

10. The container forming apparatus of claim 1, wherein the adhesive applicators are configured to apply the hot-melt adhesive having a viscosity of at least 2000 centipoise (cps).

11. A method of forming a container from a blank using a container forming apparatus, the blank including a bottom panel, two opposing side panels, two opposing end panels, four corner panels, and a respective flange panel extending from a top edge of each end panel, side panel, and corner panel, the apparatus including (i) a blank transfer station including an adhesive assembly having a plurality of adhesive applicators, and (ii) a compression station downstream of the blank transfer station, the compression station comprising a vertically movable mandrel and a forming tool below the mandrel, wherein the forming tool defines a cavity therein and has an inner profile complementary in shape to an outer profile of the mandrel, the method comprising: transferring the blank through the adhesive assembly; applying, using the plurality of adhesive applicators, hot-melt adhesive to an exterior surface of the flange panels extending from the top edge of the corner panels; positioning the blank below the mandrel; using the mandrel, driving the blank downwards into the cavity of the forming tool, said driving causing the forming tool to: rotate the corner panels inwardly into engagement with the mandrel; rotate the side panels and end panels inwardly into engagement with the mandrel; rotating, using compression plates coupled to the mandrel, rotate the flange panels outwardly into engagement with a top edge of the forming tool; and compressing, using the compression plates, the flange panels extending from the top edge of the corner panels against the flange panels extending from the top edge of the side and end panels to form the container having a fully formed top flange.

12. The method of claim 11, wherein the forming tool includes side walls, end walls, and corner walls.

13. The method of claim 12, wherein the corner walls have channels defined in a top surface thereof.

14. The method of claim 13, wherein the side and end panels of the blank include de-nesting tabs, and wherein the channels defined in the corner walls of the forming tool are configured to accommodate the de-nesting tabs therein when the container is formed from the blank.

15. The method of claim 14, wherein the channels have a depth greater than or equal to a height of the de-nesting tabs.

16. The method of claim 11, wherein the compression station further includes a plurality of forming plates coupled to the forming tool, the method further comprising rotating the side panels, end panels, and corner panels inwardly as the mandrel is lowered into the forming tool.

17. The method of claim 11, further comprising transferring, using a clamping tool, the formed container from the compression station to a stacking station.

18. The method of claim 11, further comprising advancing the blank, including the hot-melt adhesive applied thereto, from the adhesive assembly to the compression station while the holt-melt adhesive remains molten.

19. The method of claim 18, further comprising controlling, using a control system, a timing of the compression station such that the hot-melt adhesive cures during compression of the blank to form the container.

20. The method of claim 11, wherein applying hot-melt adhesive comprises applying the hot-melt adhesive having a viscosity of at least 2000 centipoise (cps).

* * * * *